(12) United States Patent
Vivian et al.

(10) Patent No.: US 7,013,325 B1
(45) Date of Patent: Mar. 14, 2006

(54) METHOD AND SYSTEM FOR INTERACTIVELY GENERATING AND PRESENTING A SPECIALIZED LEARNING CURRICULUM OVER A COMPUTER NETWORK

(75) Inventors: Kathryn B. Vivian, Pleasantville, NY (US); Steinar Hjelle, Weston, CT (US)

(73) Assignee: Genworth Financial, Inc., Richmond, VA (US)

( * ) Notice: Subject to any disclaimer, the term of this patent is extended or adjusted under 35 U.S.C. 154(b) by 783 days.

(21) Appl. No.: 09/695,830

(22) Filed: Oct. 26, 2000

(51) Int. Cl.
*G06F 15/16* (2006.01)
(52) U.S. Cl. ............... 709/203; 709/217; 709/218; 709/219; 434/322; 434/323; 434/350
(58) Field of Classification Search ........... 709/203, 709/104, 217–219, 18, 276, 229, 228, 206, 709/204; 434/322–323, 350, 362; 713/182; 707/104, 102, 10; 715/531
See application file for complete search history.

(56) References Cited

U.S. PATENT DOCUMENTS

| | | |
|---|---|---|
| 5,590,360 A | 12/1996 | Edwards |
| 5,978,767 A | 11/1999 | Chriest et al. |
| 6,101,515 A * | 8/2000 | Wical et al. ............... 715/531 |
| 6,149,438 A | 11/2000 | Richard et al. |
| 6,162,060 A | 12/2000 | Rrichard et al. |
| 6,370,355 B1 * | 4/2002 | Ceretta et al. ............ 434/350 |
| 6,457,010 B1 * | 9/2002 | Eldering et al. ........... 707/10 |

OTHER PUBLICATIONS

PCT/USO1/322622, filed Oct. 24, 2001.

* cited by examiner

*Primary Examiner*—Jason D. Cardone
*Assistant Examiner*—Hieu Le
(74) *Attorney, Agent, or Firm*—Hunton & Williams

(57) ABSTRACT

A system and method for providing a specialized learning curriculum to users over a computer network. At least one server computer associated with a education content provider hosts a learning center web site that solicits and receives personal information from users relating to the users' interest preferences and demographic information. Using this information, the server computer generates a specialized learning curriculum based upon each user's selected interests and other information. The curriculum may include articles, on-line courses, on-line workshops, interactive games and user activities, and interactive calculation tools provided by both the education content provider and third party content providers. Upon curriculum creation, the user may select content items for subsequent display and evaluation. The system also provides a variety of additional features such as an internal message service, a reminder service, a news service, and a notes service.

14 Claims, 18 Drawing Sheets

METHOD AND SYSTEM FOR INTERACTIVELY GENERATING AND PRESENTING A SPECIALIZED LEARNING CURRICULUM OVER A COMPUTER NETWORK

BACKGROUND OF THE INVENTION

The present invention relates generally to on-line systems for providing content to users. More particularly, the present invention relates to a method and system for generating and presenting a user-specific curriculum to users in an on-line environment.

Effectively teaching the most people in the most efficient manner possible has ever been the admirable goal of most educators. Until recently, however, limitations in effective classroom size and location have limited the number of people that could effectively be taught. Now, with the advent of the Internet and other network based virtual environments, educators have attempted to utilize the distributed nature of such networks to bring together a combination of student-users and resources heretofore impossible.

Although more and more people are able to hear the educators message, with the increase in effective class size there has been a corresponding decrease in the amount of interactivity between the students and the teachers. This, unfortunately, results in many students failing to receive the type and manner of education to which they would best respond. In conventional on-line education systems, users are presented with a wide variety of course selections and resource materials, leaving it up to the individual user to search through the various offering to best determine the materials suited to them. This burden turns some prospective students away from on-line learning as overly time consuming and hit-or-miss in nature.

Therefore, there is a need in the art of on-line education services, for an educational system which addresses the content concerns of prospective students by generating a specialized curriculum of materials for each student-user. There is also a need for a education based web-site designed to offer specialized educational materials as well as a variety of additional resources for enabling users to maximize the education process most effectively.

BRIEF SUMMARY OF THE INVENTION

The present invention overcomes the problems noted above, and provides additional advantages, by providing a system and method for providing a specialized learning curriculum to users over a computer network. A server computer associated with an education content provider hosts a learning center web site that solicits and receives personal information from users relating to the users' interest preferences and demographic information. Using this information, the server computer generates a specialized learning curriculum based upon each user's selected interests and other information. The curriculum may include articles, on-line courses, on-line workshops, basic tutorials, interactive games and user activities, and interactive calculation tools provided by both the education content provider and third party content providers. The system preselects and displays only curriculum elements that are highly evaluated by other system user-students.

Upon curriculum creation, the user may select content items for subsequent display and evaluation. By providing for the submission of content and service evaluations, the system enables users to affect the resources available and the manner in which the resources are presented. In addition to the specialized learning curriculum, the system also provides a variety of additional features such as an internal message service, a reminder service, a news service, and a notes service.

BRIEF DESCRIPTION OF THE DRAWINGS

The present invention can be understood more completely by reading the following Detailed Description of exemplary embodiments, in conjunction with the accompanying drawings, in which.

DETAILED DESCRIPTION OF THE INVENTION

Figure 1:
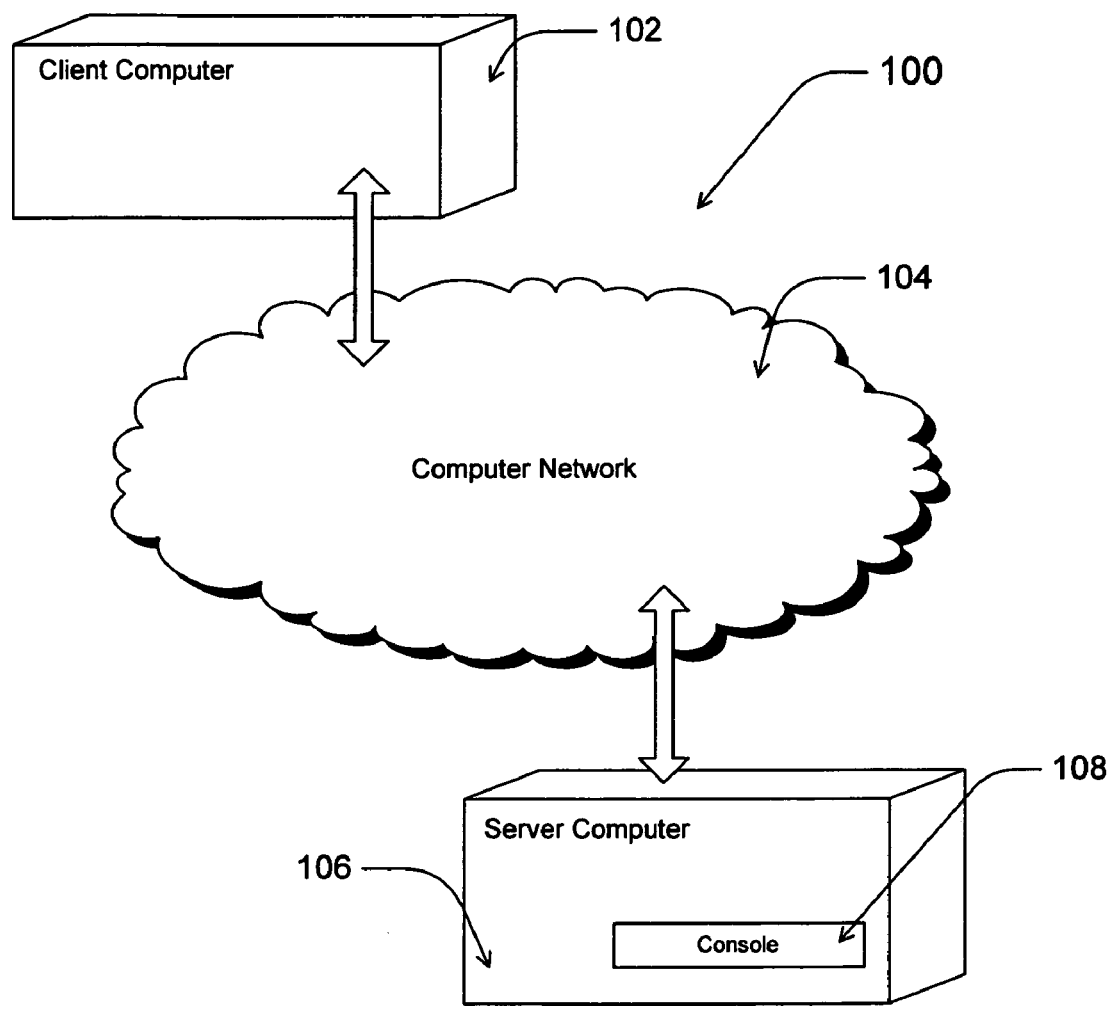
FIG. 1 is a block diagram of a computer network suitable for implementing a method and system according to the present invention.

An Internet computer system 100 is generally illustrated in FIG. 1. A conventional client computer system 102, executing a client browser application that supports the HTTP protocol, is connected typically through a network service provider to a suitable computer network 104 such as the Internet.

Client computer system 102 may include, for instance, a personal computer running the Microsoft Windows™ 95, 98, Millenium™, NT™, or 2000, Windows™CE™, PalmOS™, Unix, Linux, Solaris™, OS/2™, BeOS™, MacOS™ or other operating system or platform. Client computer system 102 may also include a microprocessor such as an Intel x86-based device, a Motorola 68 K or PowerPC™ device, a MIPS, Hewlett-Packard Precision™, or Digital Equipment Corp. Alpha™ RISC processor, a microcontroller or other general or special purpose device operating under programmed control. Furthermore, client computer system 102 may include electronic memory such as RAM (random access memory) or EPROM (electronically programmable read only memory), storage devices such as a hard drive, CDROM or rewritable CDROM or other magnetic, optical or other media, and other associated components connected over an electronic bus, as will be appreciated by persons skilled in the art. Client computer system 102 may also include a network-enabled appliance such as a WebTV™ unit, radio-enabled Palm™ Pilot or similar unit, a set-top box, a networkable game-playing console such as Sony Playstation™ or Sega Dreamcast™, a browser-equipped cellular telephone, or other TCP/IP client or other device.

In addition to the Internet, suitable computer networks may also include or interface with any one or more of, for instance, an local intranet, a PAN (Personal Area Network), a LAN (Local Area Network), a WAN (Wide Area Network), a MAN (Metropolitan Area Network), a storage area network (SAN), a virtual private network (VPN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, computer network 104 may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. Computer network 104 may yet further include or interface with any one or more of an RS-232 serial connection, an IEEE- 1394 (Firewire) connection, a Fibre Channel connection, an IrDA (infrared) port, a SCSI (Small Computer Systems Interface) connection, a USB (Universal Serial Bus) connection or other wired or wireless, digital or analog interface or connection.

A server computer system 106 is also coupled typically through an Internet Service Provider to the Internet 104. The server computer system 106 may be or include, for instance, a workstation running the Microsoft Windows™ NT™, Windows™ 2000, Unix, Linux, Xenix, IBM AIX™, Hewlett-Packard UX™, Novell Netware™, Sun Microsystems Solaris™, OS/2™, BeOS™, Mach, Apache, OpenStep™ or other operating system or platform. The server computer system 106, controlled by a local console 108, executes at least one web server application conventionally known as a HTTPd server. In addition, the server computer system 106 preferably provides local storage for at least one, though typically many, web pages. Also, server computer system 106 may include several individual server computers at various locations on the network.

The client computer system requests a web page by issuing a URL request through the Internet 104 to the server system 106. A URL consistent with the present invention may be a simple URL of the form:

<protocol_identifier>://<server_path>/<web_page_path>

A "protocol_identifier" of "http" specifies the conventional hyper-text transfer protocol. A URL request for a secure Internet communication session typically utilizes the secure protocol identifier "https," assuming that the client browser and web server each support and implement the secure sockets layer (SSL). The "server_path" is typically of the form "prefix.domain," where the prefix is typically "www" to designate a web server and the "domain" is the standard Internet sub-domain.top-level-domain of the server system 106. The optional "web_page_path" is provided to specifically identify a particular hyper-text page maintained by the web server.

In response to a received URL identifying an existing web page, the server system 106 returns the web page, subject to the HTTP protocol, to the client computer system 102. This web page typically incorporates both textural and graphical information including embedded hyper-text links, commonly referred to as hyperlinks, that permit the client user to readily select a next URL for issuance to the Internet 104.

The URL issued from the client system 102 may also be of a complex form that identifies a common gateway interface (CGI) program on a server system 106. Such a HTML hyperlink reference is typically of the form:

<form action="http://www.vendor.com/cgi-bin/logon.cgi" method=post>

A hyper-text link of this form directs the execution of the logon.cgi program on an HTTP server in response to a client-side selection of the hyperlink. A logon form supported by a logon CGI program is typically used to obtain a client user login name and password to initiate an authenticated session between the client browser and web server for purposes of supporting, for example, a secure purchase transaction or a secure communications session.

Figure 2:
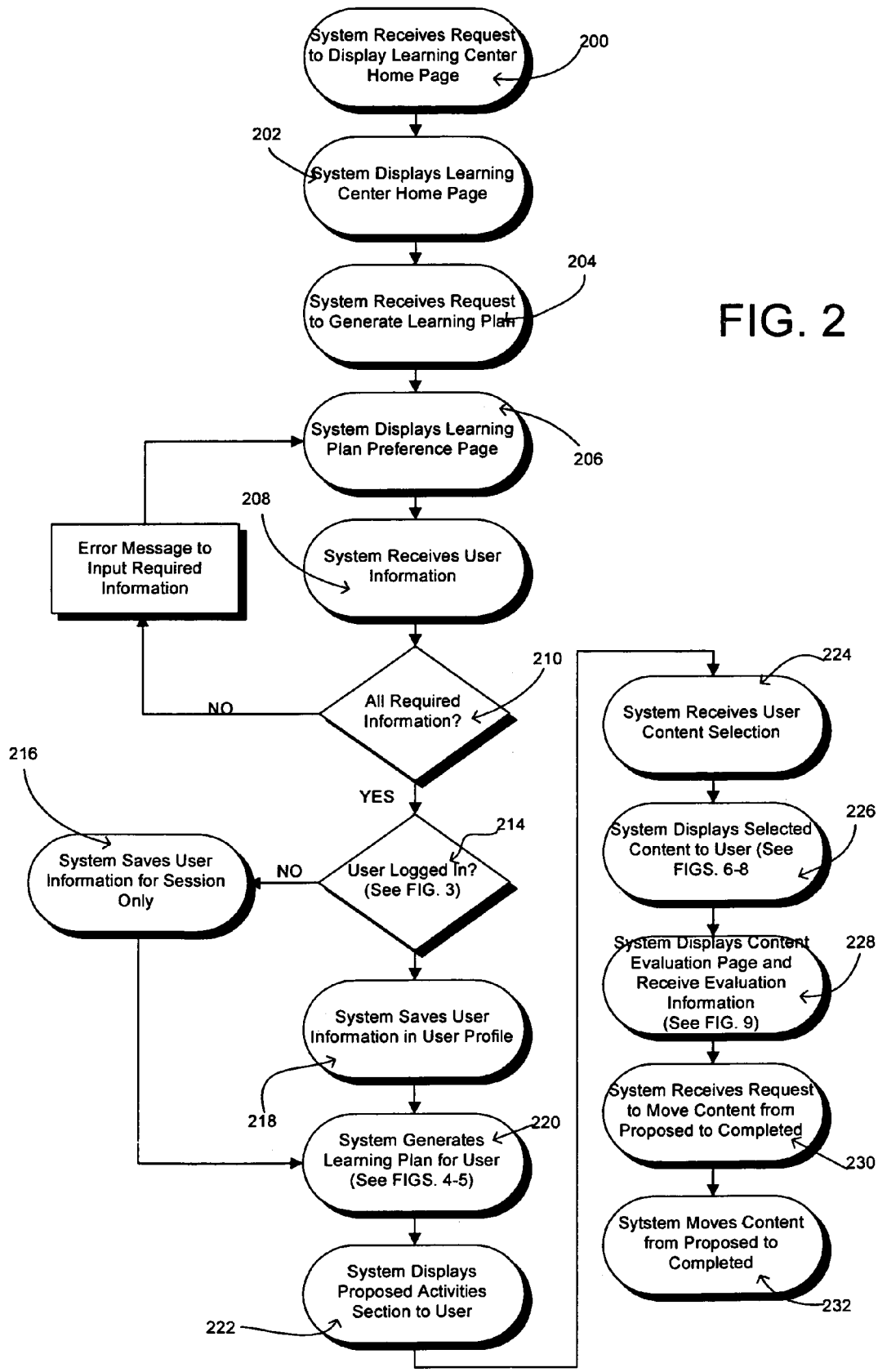
FIG. 2 is a flow chart describing one embodiment of a method for determining and presenting a learning curriculum over the network of FIG. 1.

Referring now to FIG. 2, there is shown a flow chart describing one embodiment of a method for determining and presenting a learning curriculum preferably implemented over an Internet-based computer network such as that described in FIG. 1 above. Preferably, the method and system described below is implemented by a computer software program, such as a web server application, resident on one or more server computers (such as server computer system 106, described above) associated with an education service content provider. Preferably, such a web server application is utilized to create and maintain a plurality of dynamically interactive web pages on the server computers. In a preferred embodiment, users of the education service are connected to the service web pages through a plurality of client computers (such as client computer system 102) over the computer network. In this manner, service users may remotely interact with the service to obtain, exchange, or modify information as more fully set forth in detail below.

Although not limited thereto, computer software programs for implementing the present method may be written in any number of suitable programming languages such as, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Perl, UNIX Shell, Visual Basic or Visual Basic Script, Virtual Reality Markup Language (VRML), ColdFusion™ or other compilers, assemblers, interpreters or other computer languages or platforms.

In step 200, the service's server computer system (hereinafter generally referred to as "the system") receives a request from a user's client computer system (hereinafter referred to as "the user") to display a learning center home page which briefly describes the nature of the educational services provided and includes thereon a plurality of user options, discussed in detail below. As is known in the art, a home page is, generally speaking, the first page of a web site, or a collection of related web pages and provides a starting point for enabling a user to navigate through the site in an orderly, user-friendly manner. In step 202, the system displays the learning center home page to the user. Following display of the home page, the user is enabled to choose from a variety of options related to various types of information. In one embodiment, the system, in step 204, receives a request to generate a learning plan. Upon receipt of such a request, the system displays, in step 206, a learning plan preferences page including a plurality of interest topic fields. By selecting a desired number of interest topic fields, up to a predetermined maximum, preferably four, the user informs the system of the areas in which education is desired, thereby enabling the system to establish and provide a curriculum to the user that meets the specific needs of the user.

Particular interest topics offered to the users vary depending upon the type of education being provided by the system. In one embodiment, the education system provides information related to finances other money matters. Although not limited thereto, suitable examples of interest topic fields for this embodiment may include: retirement planning, estate planning, tax management, annuity management, building a financial plan, education savings, sudden financial changes, healthcare financing, owning and automobile, owning a home, life insurance, investments.

In addition to the interest topic fields, preferably users interact with the system to select a user community (also referred to as a 'one click identifier') to which they feel they belong. In one embodiment, a menu is provided on the learning plan preferences page including a plurality of descriptive community identifiers, from which the user selects an applicable community. Relating to the financial education example described above, examples of suitable user communities may be broken down by family status and/or age and may include the following: single and starting out, married without children, children at home, single and established, empty nesters, and retired. By selecting a particular community, the system is able to provide educational materials designed to meet the needs of members of each community.

In step 208, the system receives the user's selected interest topic fields and selected community. Next, in step 210, the system determines whether the user has failed to submit any required information and whether the user has exceeded the predetermined maximum number of interest topics. If so, the user is returned to the learning plan preferences page, in step 212, with an error message indicating that required information has not been submitted or that the maximum number of interest topics has been exceeded. If all required information has been submitted and the maximum number of topics has not been exceeded, the system, in step 214, determines whether the user is "logged in" to the system. The phrase "logged in" is understood in the art to mean that the user has previously registered his/her identity with the system and has established log-in credentials, such as a unique username and password combination, associating this identity with particular information stored by the system. Logging in to the system typically provides the registered user with access to materials not available to unregistered users. Preferably, the learning plan preferences page indicates the benefits of system registration and enables the user to register if desired. The distinction between registered and unregistered users will be described in additional detail below.

Figure 3:
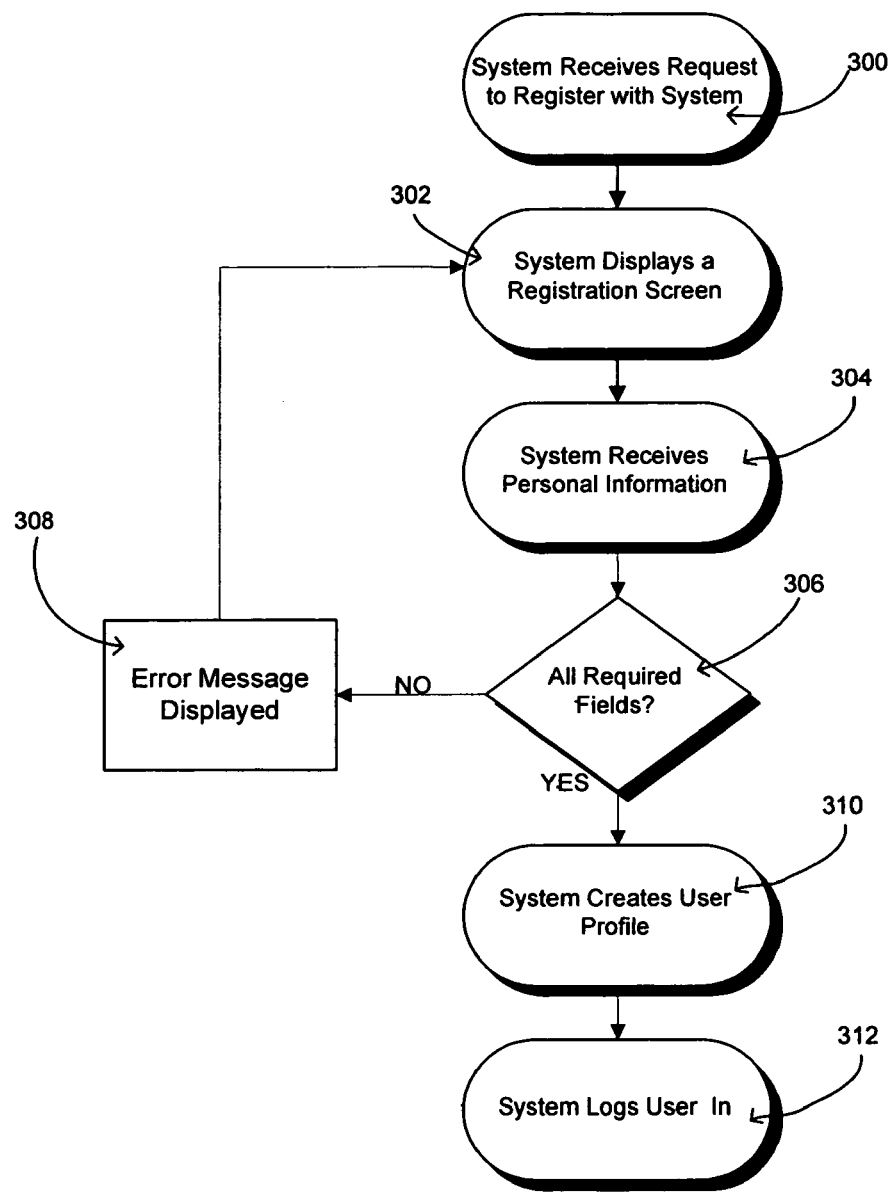
FIG. 3 is a flow chart describing one embodiment of a method for registering with the education system.

Referring now to FIG. 3, there is shown a flow chart describing one method for registering with the education system. In step 300, the system receives a request, from a user, to register with the system. In response to this request, the system, in step 302, displays a registration screen preferably including a plurality of fields for receiving various pieces of user information, such as username preference, password, email address, and name. In addition to administrative information, in accordance with one preferred embodiment of the present invention, the registration screen will also include a plurality of selectable interest topic fields and a community selection menu, as described above. In addition to community and interest topic fields, registration information also preferably includes a skill level indicator. By selecting an appropriate skill level of either "basic" or "beyond basic", the user can more specifically narrow the suggested content. Although recommended for maximum service benefits, selection of particular interest fields and skill level may be an optional step in the registration process. In step 304, the system receives the user's personal information and interest selections. Next, in step 306, the system determines whether all required fields have been completed and, simultaneously, whether the selected username is available. If any required fields have not been completed or the selected username is not available, the system, in step 308, generates an appropriate error message and returns the user to the registration screen, giving the user an opportunity to correct the problem.

If all required information is received and the selected username is available, the system, in step 310, creates a user profile matching the submitted information with the selected username and password, thereby enabling subsequent information retrieval upon user log in. Further, the user profile is also used to store additional user information relating to the user's particular education process. Once a profile has been created, the system, in step 312, logs the user into the system and presents a registration confirmation to the user. Additionally, in a preferred embodiment, the system electronically transmits a welcome message via email to the users selected email address.

Once the user has registered with the system, the user may subsequently elect to modify the registration information to reflect changes in personal information or interest preferences, such as address changes, email changes, etc. This registration edit process may be selected by the user once the user has logged in to the system and generally includes a re-display of the initial registration screen, wherein the fields are pre-populated with the user's prior submissions. The user may then modify any of the selected information fields and re-submit the form to the system.

Figure 4:
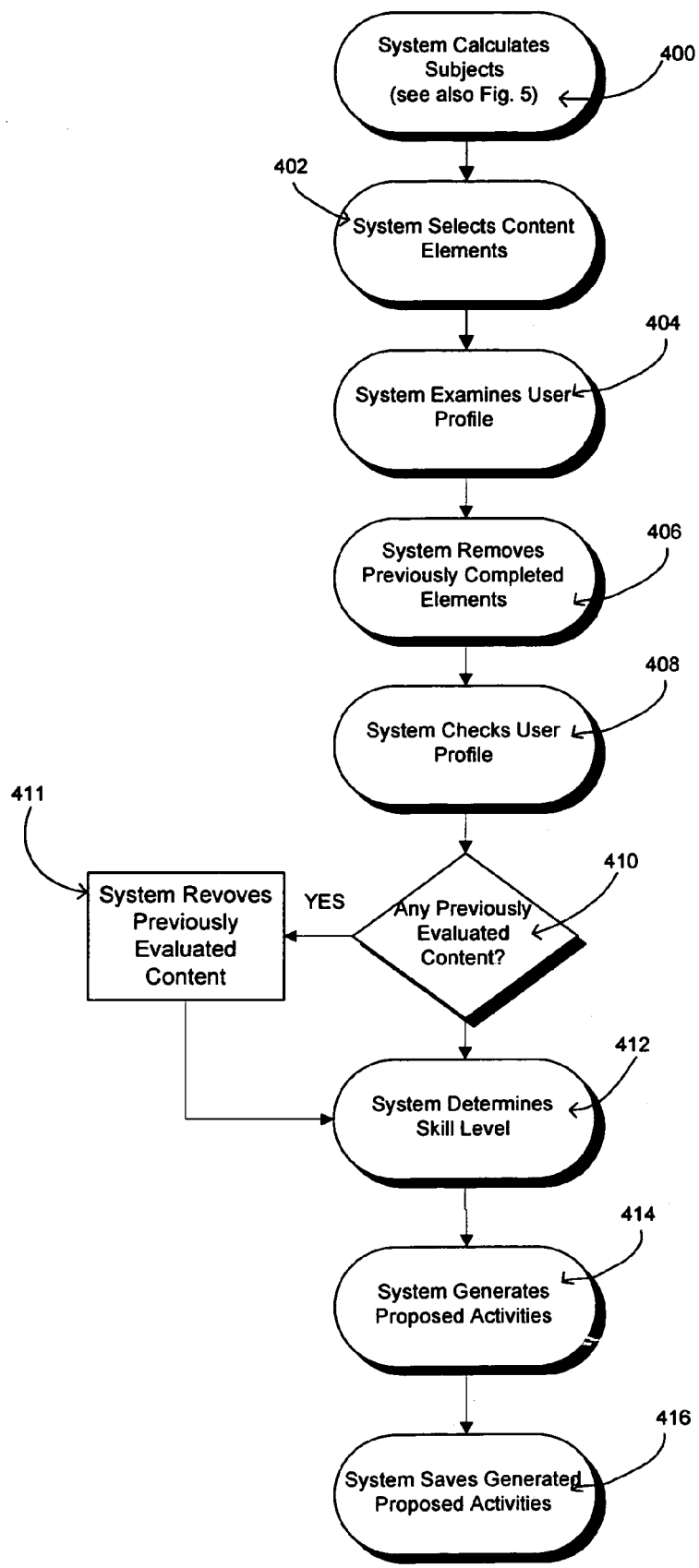
FIG. 4 is a flow chart describing one embodiment of a method for generating a specialized learning plan.

Returning now to FIG. 2, if the system has determined in step 214 that the user is not logged in to the system, the system, in step 216, saves the submitted interest information only for the particular session. However, if the user is logged in, the system, in step 218, saves the submitted interest information as part of the user's profile (discussed above) which is maintained for future use. Next, in step 220, the system generates a Learning Plan for the user. The Learning Plan a specialized learning curriculum generated specifically for the particular user and is based upon several factors including the interest topics selected by the user, the community or one-click identifier selected by the user, the content items previously completed by the user, and the determined skill level of the user. Preferably, the Learning Plan includes several distinct sections including: 1) a proposed activities section, including content elements not yet completed, evaluated, or deleted; 2) a completed activities section, including a listing of all previously completed elements for enabling users to track their progress; and 3) an enrolled activities section, including courses and workshops which the user is either currently enrolled in or has previously participated in. A detailed description of the operation of step 220 is set forth in FIG. 4, below.

In step 400, the system, using the interest topics and community selected by the user during registration or preference selection, calculates a plurality of subjects, preferably four, for inclusion into a proposed activities section, which will detail the proposed curriculum generated for the user. If the user has selected a number of interest topics less than or greater than four, the system applies the priority matrix described below, to determine which four interest topics to utilize for the learning plan generation. In step 402, the system selects all appropriate content elements that could be included in the learning plan, based on the interests identified in step 400. Content elements include articles, on-line courses, on-line workshops, basic tutorials, interactive games and user activities, interactive calculation tools, or any other medium suitable for educating the user in an on-line environment, whether wholly contained within the education system or incorporated from external sources. Next, in step 404, the system examines the user's profile (if the user is logged in) and determines whether the user has previously completed any of the content elements selected in step 402. If so, the system, in step 406, removes the previously completed elements from the listing of possible content elements. In step 408, the system again checks the stored user profile (if the user is logged in) for learning plan content elements which have been deleted by the user and, accordingly, removes such content elements from the listing of possible content elements.

In step 410, the system examines the user's profile (if logged in) and determines whether any of the assembled possible content elements have been previously evaluated by the user, and, if found, removes the previously evaluated content from the listing of possible content elements. Next, the system, in step 412, applies the skill level of the user (if any) to further narrow down the list of possible content elements. The skill level of the user is based upon the skill level indicator submitted by the user upon registration. If the user selected "basic" as their skill level, only content classified as "basic" will be presented to the user. If the user selected "beyond basic", only content classified as "beyond basic" will be presented to the user. If no indication as to skill level was made by the user during registration, or if the user is unregistered, content from both levels may be presented to the user. Once the list of possible content has been narrowed by the selected skill level of the user, in step 414, generates a proposed activities section of a Learning Plan for each selected interest topic by selecting content elements from the remaining list of possible content elements.

Preferably, the content elements are broken down into four discrete categories: 1) on-line courses and workshops, 2) basic tutorials, 3) articles, and 4) interactive games, user activities and calculation tools. Using these categories, for each selected interest topic, the system selects a preselected number of content elements from each category, preferably two (2) course and workshop elements, one (1) basic element, four (4) article elements, and two (2) game and tool elements. In step 416, the system saves the generated proposed activities section. If the user is logged in, the proposed activities section is saved into the user's profile. If the user is not logged in, the system saves the proposed activities section only for the particular user session.

Figure 5:
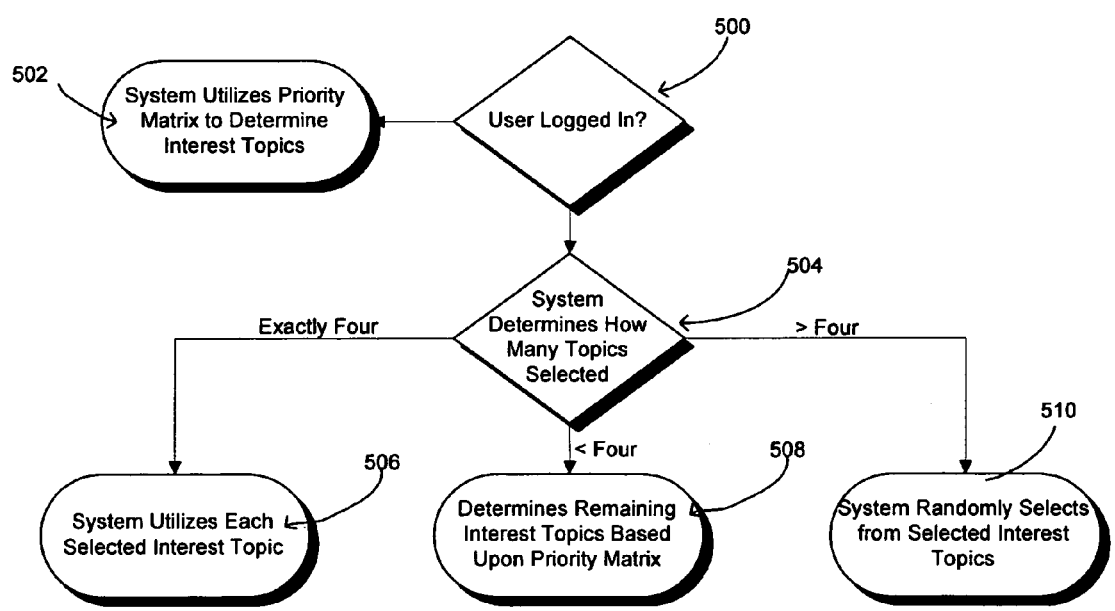
FIG. 5 is a flow chart describing one embodiment of a method for selecting content categories for users.

Referring now to FIG. 5, there is shown a flow chart describing a method for selecting content categories for users who have not identified four interest topics. In step 500, the system determines whether the user is logged in. If not, the system, in step 502, utilizes the selected community and the priority matrix set forth below to determine which interest topics to use for learning plan generation. If, however, the user is logged in, the system, in step 504, determines how many interest topics the user has selected. If exactly four topics have been selected, the system, in step 506, utilizes each selected interest topic in generating the learning plan. If less than four interest topics are selected, the system, in step 508, determines the remaining number of interest topics based upon the selected community and the priority matrix set forth below. If more than four topics have been selected, the system, in step 510, randomly selects four topics from those selected.

|  | Starting Out | Married- No Kids | Kids at Home | Empty Nester | Single and Est. | Retired |
|---|---|---|---|---|---|---|
| Retirement Planning | 10 | 11 | 11 | 3 | 4 | 9 |
| Estate Planning | 9 | 10 | 9 | 4 | 11 | 2 |
| Managing Your Taxes | 2 | 4 | 3 | 2 | 1 | 5 |
| Building a Financial Plan | 3 | 3 | 2 | 1 | 2 | 8 |
| Saving for an Education | 12 | 12 | 5 | 12 | 12 | 7 |
| Sudden Financial Changes | 4 | 6 | 6 | 5 | 9 | 3 |
| Owning a Home | 8 | 1 | 1 | 11 | 6 | 10 |
| Owning an Automobile | 1 | 2 | 7 | 9 | 7 | 12 |
| Investments | 5 | 5 | 4 | 6 | 3 | 4 |
| Life Insurance | 6 | 8 | 8 | 7 | 10 | 6 |
| Annuities | 7 | 7 | 10 | 8 | 8 | 11 |
| Healthcare Finance | 11 | 9 | 12 | 10 | 5 | 1 |

Essentially, the above matrix lists a hierarchy of interest topic categories by community from lowest interest (12) to highest interest (1). If the user is either unregistered or has selected no interest topics, the system will select the top four (1–4) interest topics for the selected community. For example, if the user has indicated a community of Kids at Home, the system will utilize the following interest topics: 1) owning a home, 2) building a financial plan, 3) managing your taxes, and 4) investments in learning plan generation. If the user is registered and has already selected one or more of the listed topics, the system will use the next available topic to generate the curriculum (e.g., if the user has selected interest numbers 1, 2, and 4, system will use interest number 3 in learning plan generation). In this manner a learning plan overloading on a single interest will not be generated.

Returning to FIG. 2, following generation of the proposed activities section in step 220, the system displays, in step 222, the proposed activities section of the Learning Plan to the user for content selection. In step 224, the system receives a user selection to view a particular content element presented in the proposed activities section. And, in step 226, the system displays the content to the user. Methods for participating in and displaying various types of content are described in detail below in FIGS. 6–8.

Figure 6:
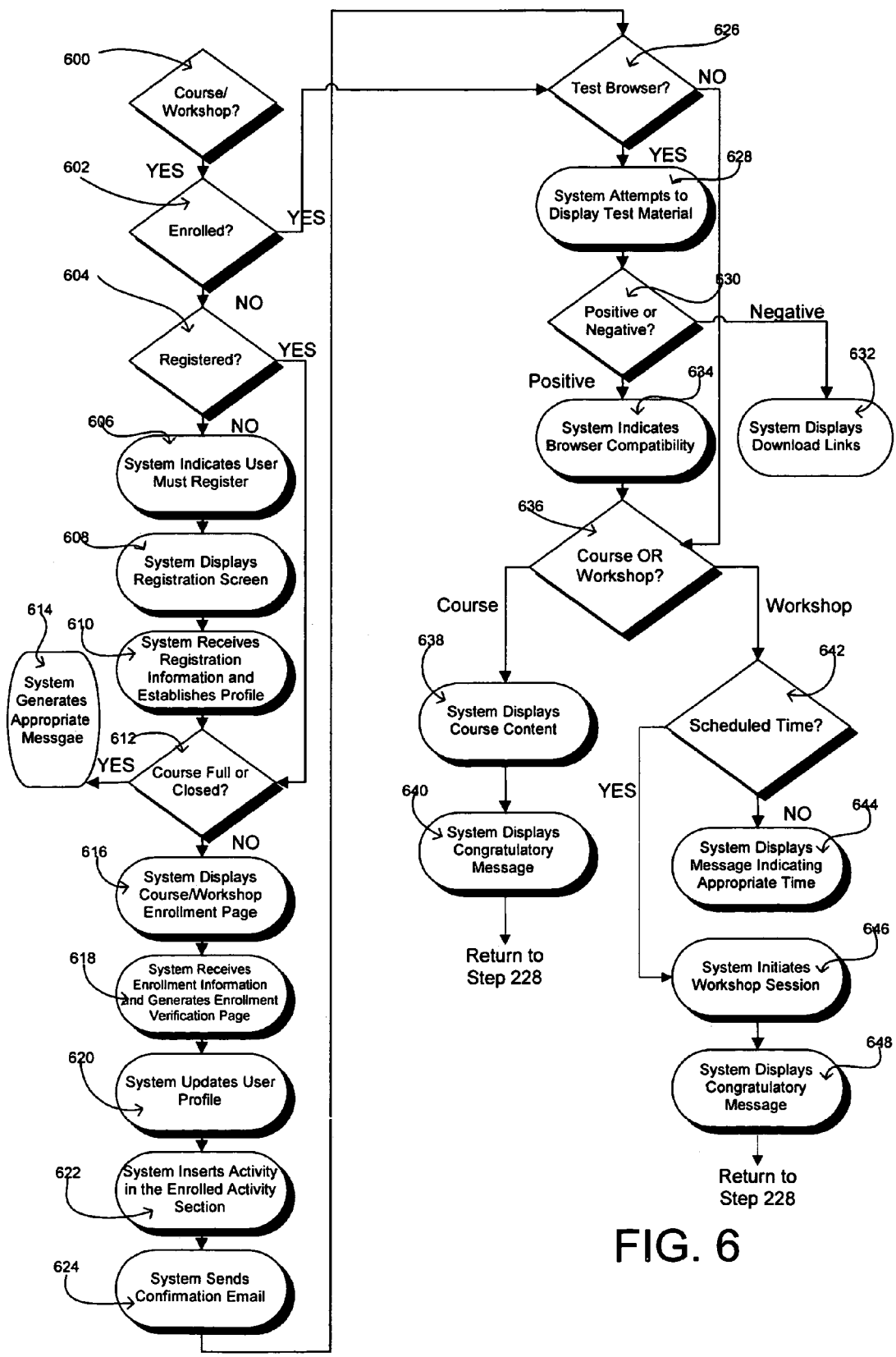
FIG. 6 is a flow chart describing one embodiment of a method for interacting 1 with a user to display course or workshop content.

Referring now to FIG. 6, there is shown a flow chart describing a method for interacting with a user to display course or workshop content, briefly described in step 226, above. In step 600, the system determines whether the selected content is a course or workshop. If the selected content is a course or workshop, the system, in step 602, determines whether the user is enrolled in the course. If enrolled, the system proceeds to step 626. However, if the user is not enrolled, the system, in step 604, determines whether the user is registered or unregistered. If registered, the system proceeds to step 612, described below. However, if the user is unregistered, the system indicates, in step 606, that the user must register in order to enroll in the selected course or workshop. Next, in step 608, the system displays a registration screen such as that described in step 302 above. In step 610, the system receives the user's registration information and establishes a user profile in the manner set forth above.

In step 612, for both previously registered and newly registered users, the system determines whether the course or workshop is full or closed. If the workshop is full or closed, the system, in step 614, generates an appropriate message and returns the user to the proposed activities section of the Learning Plan. If the selected course or workshop is not full and not closed, the system, in step 616, displays a course or workshop enrollment page to the user. Preferably, a plurality of fields are presented on the enrollment page and a portion of these fields are pre-populated by the system using the registered user's profile. In step 618, the system receives enrollment information and generates an enrollment verification page.

Once the user has been enrolled, the system, in step 620, updates the user's profile to include the enrolled activity and, in step 622, inserts the activity in the enrolled activities section of the Learning Plan. Next, in step 624, the system preferably transmits an electronic mail message to the user confirming the enrollment and containing the particular time and date (if any) of the activity.

In step 626, the system displays, to the enrolled user, an option to test the user's browser for the capabilities necessary to participate in the activity. A variety of network suitable mediums are available for enabling interactive transmission of information. However, as is understood in the art, many of these mediums require the installation of special software applications in association with the user's computer. In general, these applications are referred to as plug-ins and examples include streaming media players such as RealPlayer from RealNetworks, Inc., and Windows Media Player from Microsoft, Inc., chat clients such as ichat from ichat, Inc., etc. Because of the wide variety of software applications available to both consumers and content providers, it is advantageous for users to be able to test their browser set up to determine whether additional or upgraded applications are necessary to participate in a selected course or workshop.

If the user decides not to test their browser, the system proceeds to step 636. However, if the user decides to test their browser, the system, in step 628, attempts to display information utilizing the necessary software applications on the user's computer. Included in this display are buttons or other interactive devices which enable the user to indicate to the system whether they are able to properly view the displayed information. If, in step 630, the system receives a negative indication from the user, the system provides the user, in step 632, with links to web site resources where the required software may be obtained. However, if the system, in step 630, receives a positive indication from the user, a message indicating browser compatibility is displayed to the user in step 634.

Figure 7:
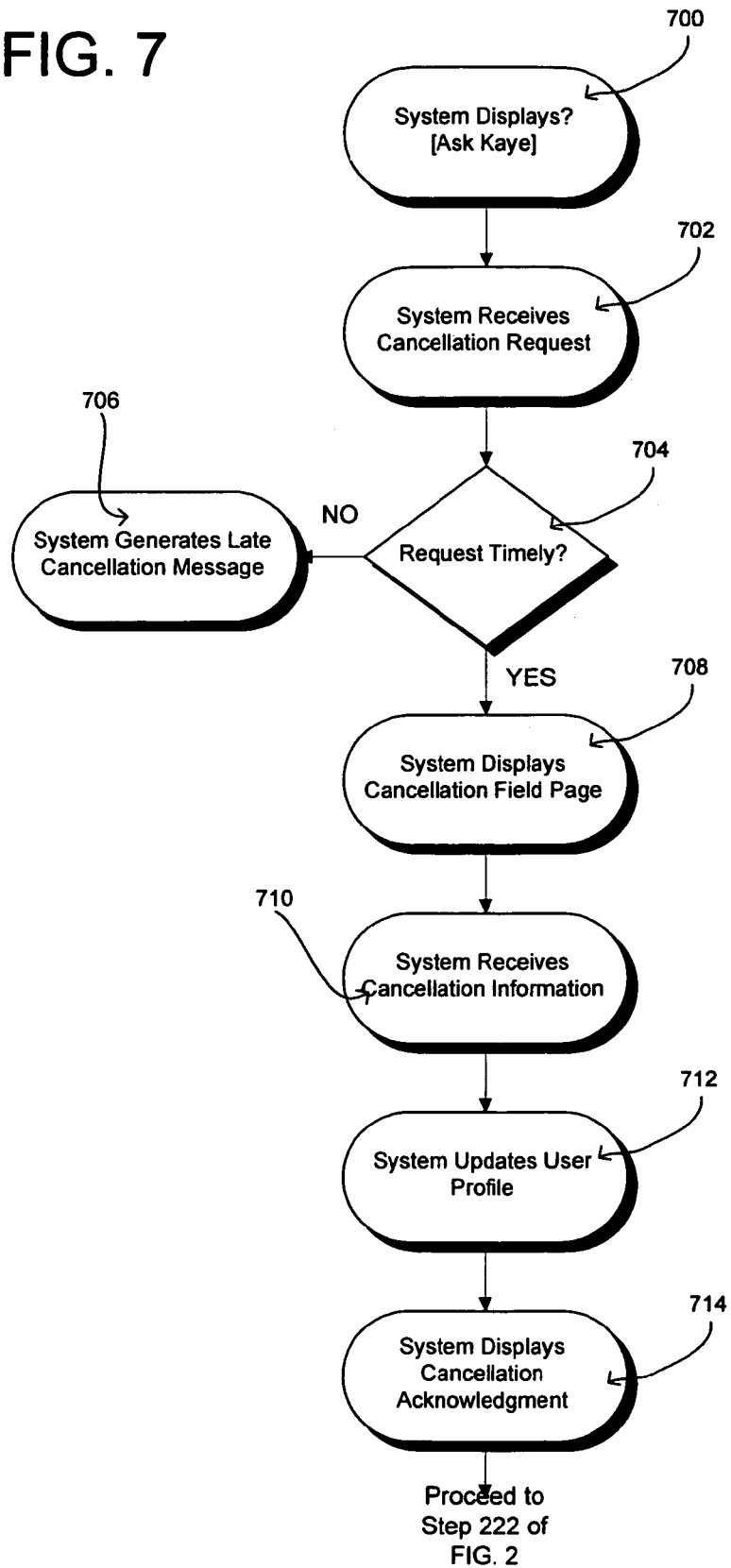
FIG. 7 is a flow chart describing one embodiment of a method for canceling a workshop.

In step 636, the system determines whether the selected activity is a course or a workshop. Unlike courses, which typically involve user-paced activities, on-line workshops preferably include scheduled activities that the user undertakes along with other participants in substantially real-time. Participants may include other student-users, instructors, and consultants. Because workshops or not typically self-directed, a user may, once enrollment has taken place, may wish to cancel their involvement in the workshop prior to its scheduled start. Referring now to FIG. 7, there is shown a flow chart describing a method for canceling a workshop in accordance with one embodiment of the present invention. In step 700, the system displays a cancel workshop or course option to the user. In step 702, the system receives a request to cancel a currently enrolled workshop. In step 704, the system determines whether the time of the cancellation request has not been made on the day of the workshop or after the workshop has occurred. If the system determines that the cancellation request is too late, the system displays, in step 706, an appropriate message to the user indicating that it is too late to cancel their enrollment and redirects the user to the proposed activities page. If however, the cancellation request is timely, the system, in step 708, displays a cancellation field page including a plurality of fields wherein the user can indicate the reason for the cancellation. In step 710, the system receives the user's cancellation information and, in step 712, updates the user's profile to indicate that the user is no longer enrolled in the workshop. In step 714, the system displays a cancellation acknowledgment message to the user and returns the user to the proposed activities section of the Learning Plan (step 222).

Referring back to FIG. 6, if, in step 636, the system determined that the activity was a course, the system, in step 638, displays the course content to the user in a self-paced manner, wherein additional material is presented upon the user's progression through the course. Upon course completion, the system, in step 640, displays a congratulatory message to the user and proceeds to step 228 of FIG. 2, described in detail below.

If, in step 636, the system determined that the selected activity is a workshop, the system, in step 642, determines whether the scheduled workshop commencement time has either occurred or will occur shortly. If the time for the workshop has not yet arrived, the system, in step 644, displays an appropriate message to the user, indicating that the workshop is not yet active and informs the user of the appropriate time. However, if the scheduled workshop time has arrived, the system, in step 646, either actively begins an interactive workshop session, or alternatively, links the user to a third party system hosting the selected workshop. Upon workshop completion, the system, in step 646, displays a congratulatory message and proceeds to step 228 of FIG. 2, described in detail below.

Figure 8:
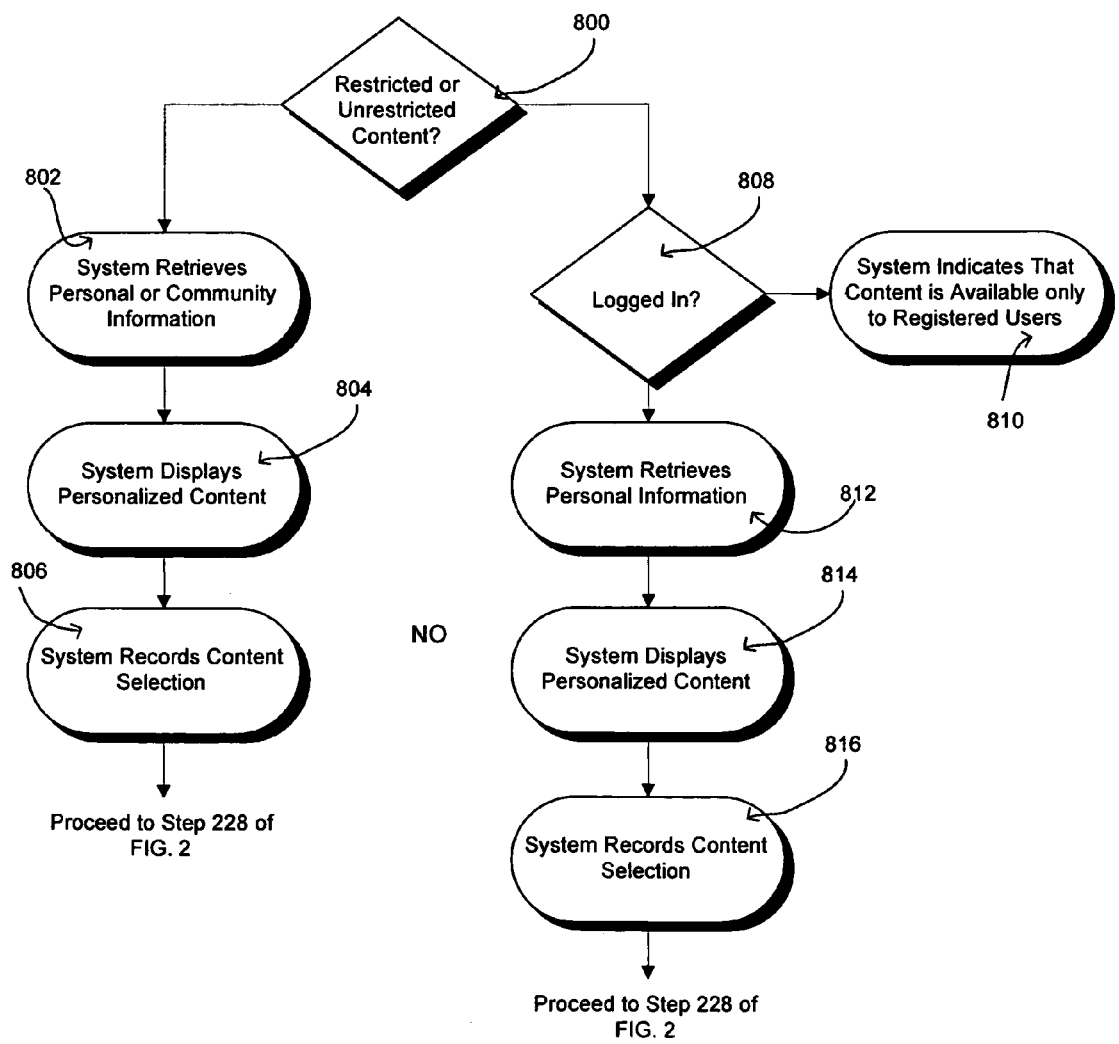
FIG. 8 is a flow chart describing one embodiment of a method for displaying basic information, articles and tools.

Referring now back to FIG. 2, the user, in step 224 may select alternative content categories to courses and workshops such as basic information pieces, articles, and interactive calculation tools. Referring now to FIG. 8, there is shown a flow chart describing one embodiment of a method for displaying basic information, articles and tools. In step 800, the system determines whether the selected content is restricted content or unrestricted content. By definition, restricted content is available only to registered users, while unrestricted content is available to all users. If the selected content is unrestricted, the system, in step 802, retrieves any personal information about the user available, that is, for registered users, the system retrieves necessary personal information from the user's profile and for unregistered users, the system retrieves the user's selected community and any other information available about the user. In step 804, the system displays personalized content to the user using the retrieved information. Further, in step 806, the system records the fact that the selected content was requested for administrative purposes.

If, in step 800, the system determines that the requested content is restricted, the system, in step 808, determines whether the user is logged in or not. If not, the system, in step 810, displays a page to the user indicating that the selected content is only available to registered users and provides the users the opportunity to either login or register with the system. If the user is logged in, the system, in step 812, retrieves any personal information about the user available necessary for personalization of the requested content. In step 814, the system displays personalized content to the user using the retrieved information. Further, in step 816, the system records the fact that the selected content was requested for rating purposes. Following content display, either for restricted or unrestricted content, the system proceeds to step 228 of FIG. 2.

It should be understood that the unrestricted or restricted content described above may be supplied and hosted directly by the system or may be hosted by third party systems. Preferably, content obtained from third party systems is opened inside of a page hosted by the system. This manner of linking content is generally described as in a frame. A frames capable browser displays multiple web pages in a single interface, thereby enable easy navigation between the pages. In this manner, the user is not fully separated from the system and may return to system hosted content or resources at any time. Using the financial education model described above, examples of suitable third party content include stock quotes, news, interactive calculators, search engines, etc. Upon completion of the external content, the frames nature of the interface enables the system to easily return the user to step 228 of FIG. 2. Alternatively, third party content may be displayed in a smaller window generally referred to as a pop-up window. In this embodiment, the user is never out of sight of the system's web page, thereby facilitating return of the user following viewing of the third party content.

Figure 9:
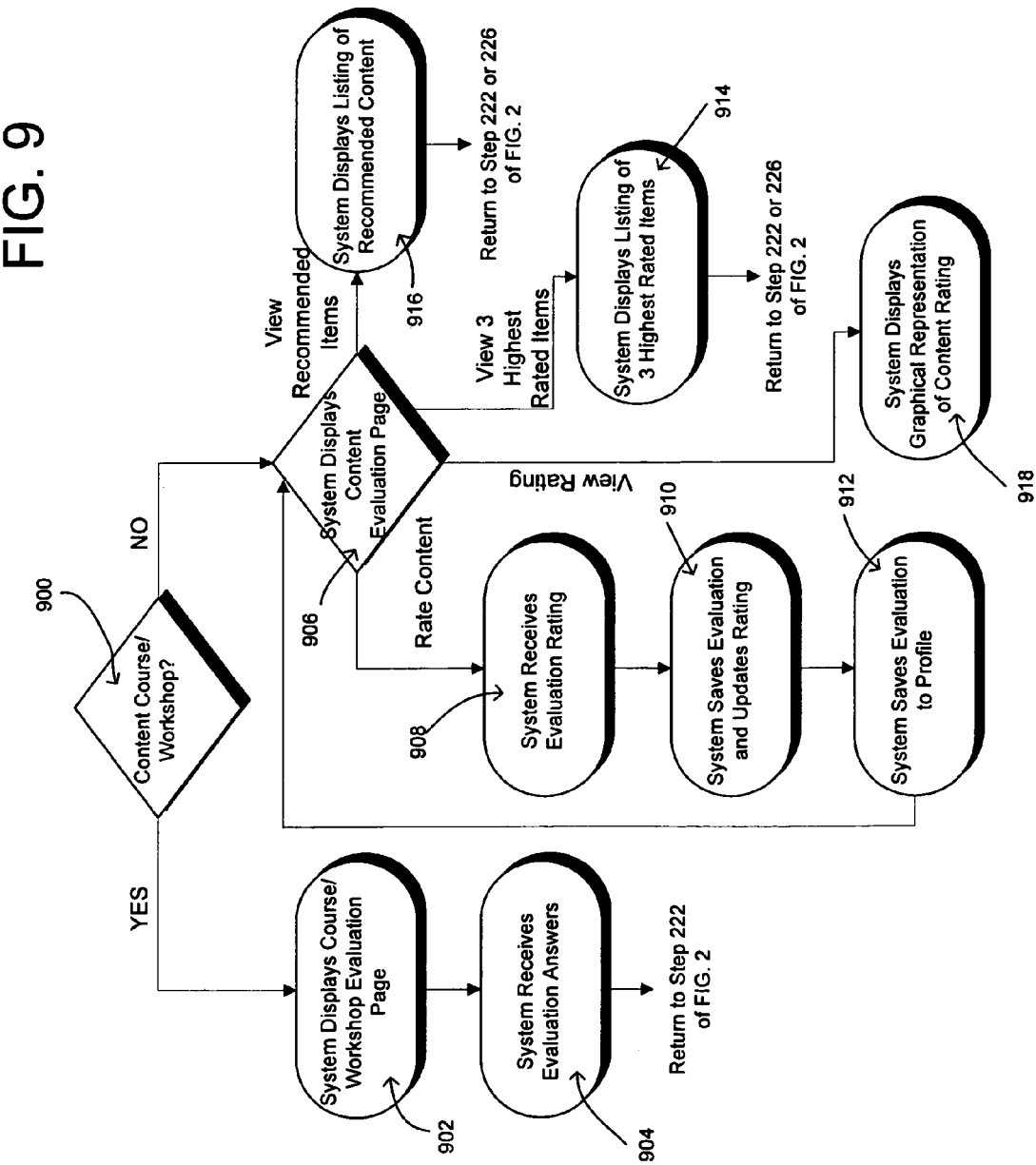
FIG. 9 is a flow chart describing one embodiment of a method for soliciting content evaluations from a user.

Once a user has viewed a content item, the system, in step 228, displays a content evaluation page to the user, thereby enabling the user to interactively evaluate the recently viewed content item, and, as described in additional detail below, actually effect the future display and retention of the content item. Referring now to FIG. 9, there is shown a flow chart describing one embodiment of a method for soliciting content evaluations, briefly described in step 228 above. In step 900, the system determines whether the viewed content was a course, a workshop, or any of the other types of content. If the system determines that the viewed content was a course or workshop, the system, in step 902 displays a course/workshop evaluation page having thereon a plurality of evaluation questions. In step 904, the system receives the user's answers to the evaluation questions and returns the user to the proposed activities section of the Learning Plan (step 222). Preferably, the course/workshop evaluation page includes an interactive rating scale having five rating options: 1—Poor; 2—So—So; 4—Good; 5—Very Good; and 6—Excellent.

If, in step 900, the system determined that the viewed content was not a course or workshop, the system proceeds to step 906 wherein a content evaluation page is displayed to the user. On one preferred embodiment, the content evaluation page includes the six point rating scale described above as well as a listing of the three highest rated content items in the selected interest topic. Further, the content evaluation page includes options to: 1) view the three highest rated related content items, 2) view recommended content by category; and 3) to view the rating of the content recently viewed (as rated by other users). If the user chooses to evaluate the content, the system receives the content rating from the user in step 908, saves the evaluation and updates the current rating of the content in step 910, stores an indication of the rating in the user's profile in step 912 and re-displays the content evaluation page to the user, replacing the rating scale with an acknowledgment that the evaluation has been received, essentially returning the user to step 906.

If the user chooses instead to view the three highest rated related content items, the system, in step 914, displays a listing of the three content items related to the specific topic and category that the user recently viewed. Content recommendations are preferably made based upon user ratings for the particular content, with higher rated content items being recommended to users. Also, preferably, the content indicated by the system as recommended should not have a rating of less than 3.5 on a 6.0 scale. If less than three content items in the selected topic category have a rating of 3.5 or above, the system will only display the items having ratings 3.5 or above. In addition, in a preferred embodiment, new content items may be indicated as recommended if less than three previously rated items above this rating limit are found. If the user elects to view recommended content by category, the system, in step 916, displays a listing of all content within the category either having a rating of 3.5 or above or considered "new" by the system. New content preferably includes content not yet rated by at least 10 users.

Once additional content listings have been displays, the system receives either a user request to view a selected recommended content item, thereby returning the user to step 226, or, a user request to return to the proposed activities section in step 222, set forth above, or a user request to return back to the content evaluation page described in step 906.

If, in step 906, the user decides to view the rating of the recently viewed content, the system, in step 918, displays a graphical representation of the content rating over the entire scale. If the content is new (i.e., less than 10 evaluations), the system does not show the ratings and, instead, returns a message indicating that the content is new and insufficient evaluations have been made to generate a valid rating.

Upon content completion, the user can choose to move the content from the proposed activities section of the Learning Plan to the completed activities section of the learning. In step 230, the system receives a user request to move a selected content item from proposed activities section to the completed activities section. Upon receipt of this request, the system, in step 232, moves the content item and refreshes the Learning Plan. The action of refreshing the Plan will, using the current plan preferences, replace the moved content item with a new item, thereby maintaining the total number of content items present in the proposed activities section of the Learning Plan.

Figure 10:
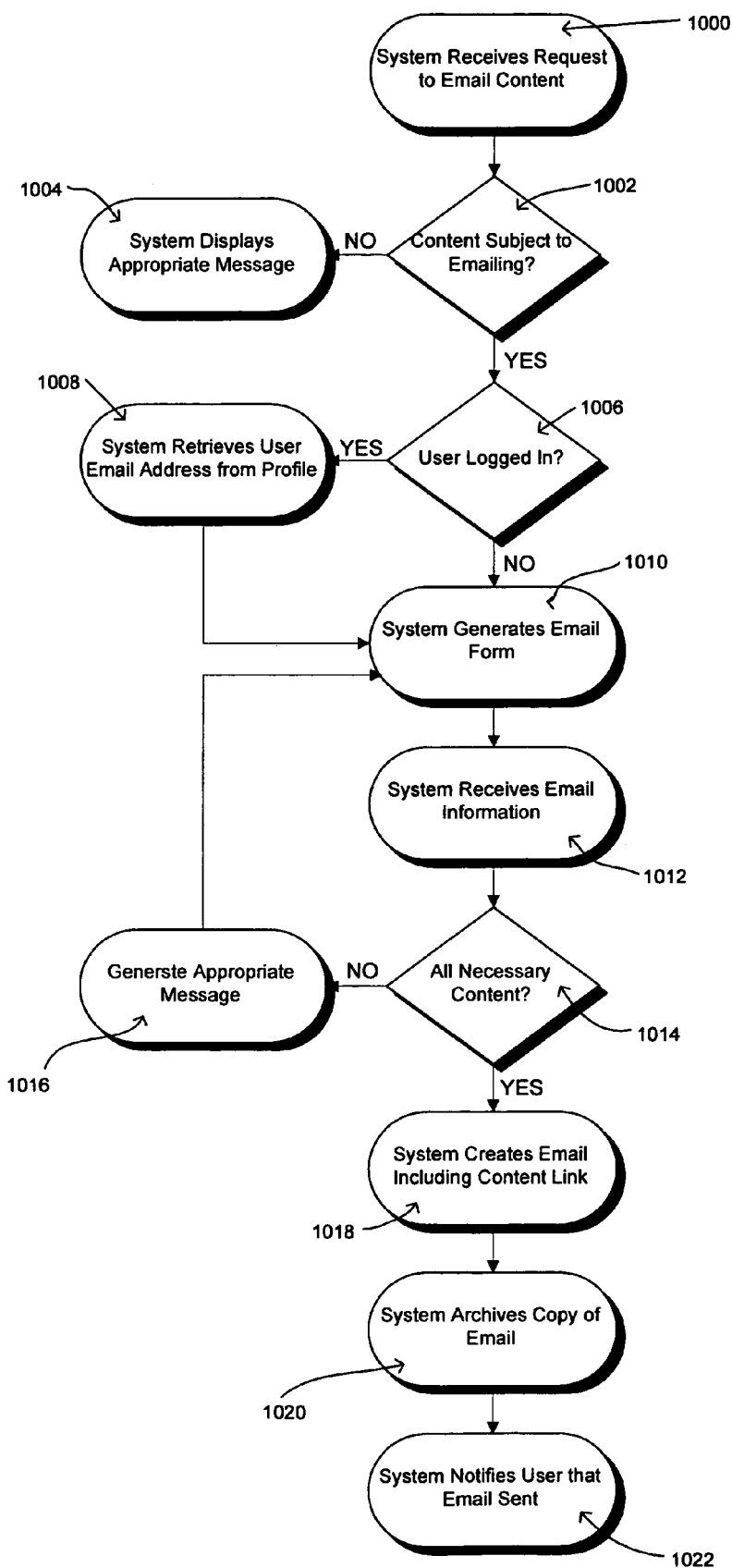
FIG. 10 is a flow chart describing one embodiment of a method for emailing content to a friend.

In a preferred embodiment of the present system, registered and unregistered users who wish to inform others about a particular content item may do so my selecting an email to friend option displayed on the content pages. In particular, the email option is preferably available only for unrestricted content hosted by the system. That is, users will not be able to email either restricted content or content hosted by third party systems, since the availability of this content can not be assured. Referring now to FIG. 10, there is shown a flow chart describing one preferred embodiment of a method for emailing content to a friend. In step 1000, the system receives a user request to email a content item to a friend. In step 1002, the system determines whether the content item is subject to emailing. If not, the system, in step 1004, generates an appropriate message and returns the user to the content page. If, however, the content is subject to emailing, the system, in step 1006 determines whether the user is logged in or not. If the user is logged in, the system, in step 1008, retrieves the user's email address from the user's stored profile information and proceeds to step 1010, where the system generates and displays an email form having a plurality of information fields, such as user email address (pre-populated from the profile for logged in users), recipient email address, an editable pre-populated subject field (preferably describing the content to be emailed), and a body field.

In step 1012, the system receives the email form field information and, in step 1014, determines whether all appropriate fields have been submitted (i.e., user email address, recipient email address). If not, the system, in step 1016 prompts the user for entry of the required information and re-displays the email form (step 1006). If all required information has been properly entered, the system, in step 1018, creates the email including a link to the beginning of the selected content item and transmits the email to the recipient. In addition, in step 1020, the system preferably archives a copy of the email to a database and logs the email to the file system for administrative purposes. In step 1022, the system notifies the user that the email has been sent and returns the user to the content page.

In addition to generating a Learning Plan including a specialized curriculum of learning-based content items, the system preferably also provides a plurality of additional features designed to enhance the learning process for the user. Preferably, these features are available from selectable options included on the learning center home page. Referring again to the financial education model described above, examples of additional features may include: 1) a bookstore section including lists of recommended books and direct links to third party vendors facilitating the on-line purchase of the books; 2) a content related newsroom collecting and displaying recent news and developments; 3) a stock portfolio and stock quotes section; and 4) a filing cabinet option for enabling users to store particular types of information relating to the system.

Figure 11:
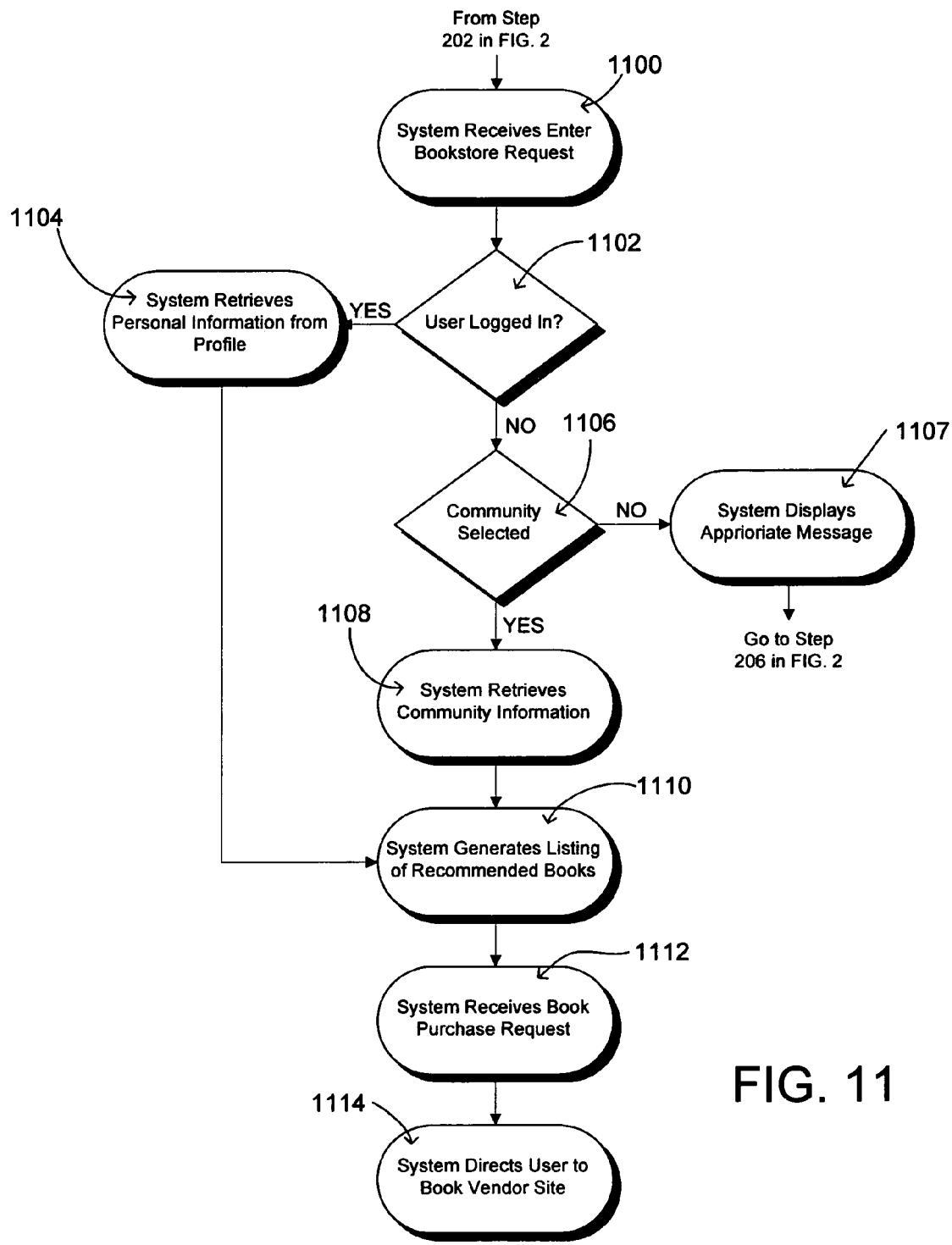
FIG. 11 is a flow chart describing one embodiment of a method for providing a direct linking to on-line retailers.

Referring now to FIG. 11, there is shown a flow chart describing one embodiment of a method for providing direct linking to on-line retailers. In step 1100, the system receives a user request to enter the bookstore section of the site. In step 1102, the system determines whether the user is logged in or not. If logged in, the system, in step 1104, retrieves personal interest information for the user from the user's profile. If not logged in, the system, in step 1106, determines whether a community has been selected by the user. If not, the system, in step 1107, displays a message indicating that book lists can only be generated for registered users or unregistered users selecting a community and returns the user to step 206 of FIG. 2. If the user has selected a community, the system, in step 1108, retrieves the user community and any interest topics selected at the start of the session. Once personal interest information is retrieved, the system, in step 1110, generates, using a book recommendation rule, a listing of recommended books available from an associated on-line retailer such as Amazon.com operated by Amazon.com, Inc. (http://www.amazon.com).

Preferably, the book recommendation rule analyzes the retrieved information and returns a maximum of four recommended titles meeting the needs of the user. If the user is logged in, the system determines whether how many interest topics the user has selected. If exactly four topics have been selected, the system displays one book for each selected interest topic. If more than four have been selected, the system randomly selects four topics and displays one book for each randomly selected topic. If less than four topics are selected, or if the user in unregistered, the system displays book corresponding to the selected topics and fills in the available slots according to the priority matrix set forth above with respect to FIG. 5. If the user is registered and has already selected one more of the listed topics, the system will select a book from the next topic (e.g., if the user has selected interest numbers 1, 2, and 4, system will provide a book related to interest number 3) In this manner multiple books related to a single interest will not be displayed.

After the book list has been displayed by the system in step 1110, the user is provided with the option to link to a third party book vendor to purchase the materials on-line. In step 1112, the system receives a request to purchase a particular book. In a preferred embodiment, the system, in step 1114, opens a pop-up window including the third party vendor's web site at a point in the site wherein, the selected item is identified and a purchase may be made.

Figure 12:
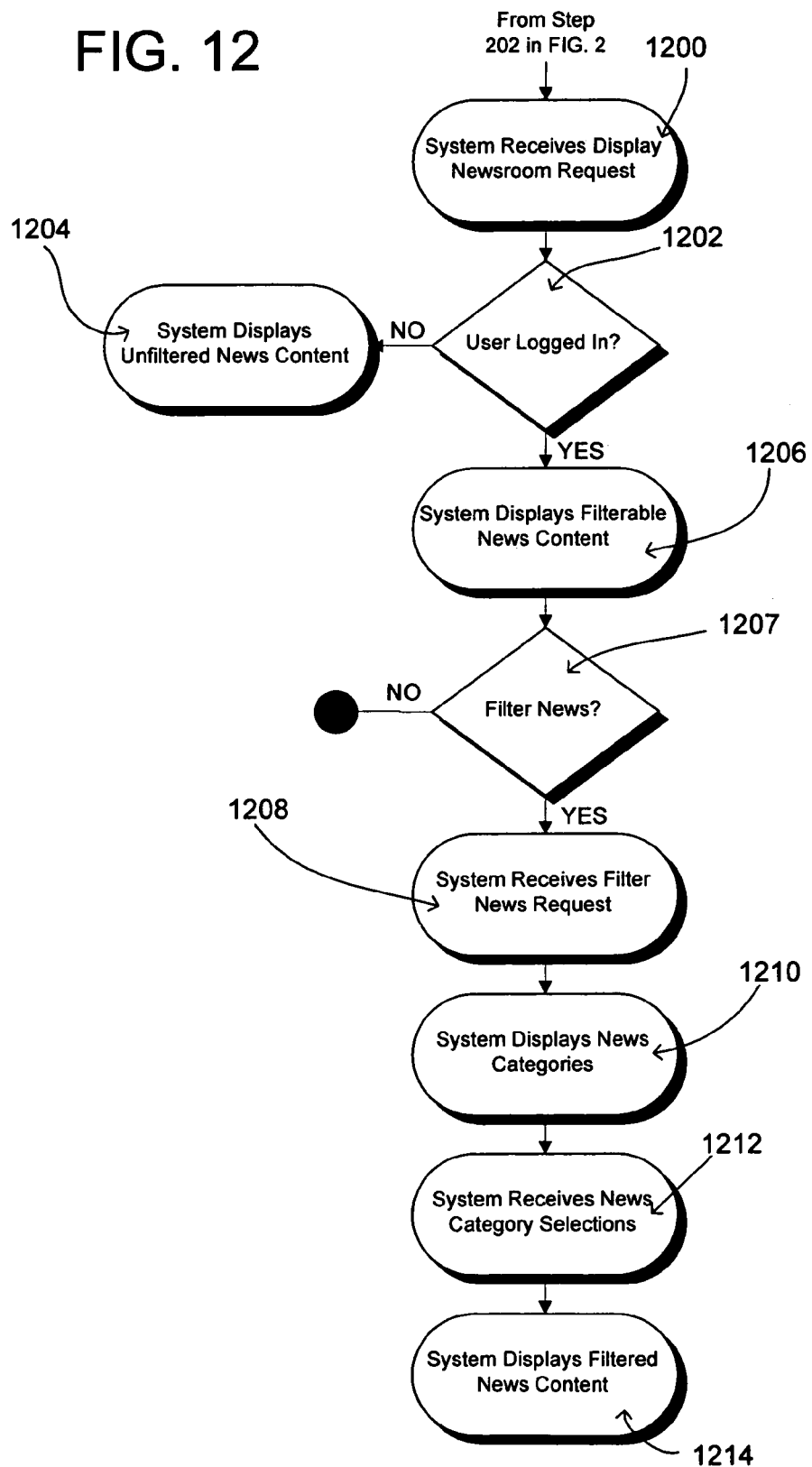
FIG. 12 is a flow chart describing one embodiment of a method for providing news content to a user.

Referring now to FIG. 12, there is shown a flow chart describing one preferred embodiment of a method for providing news content to a user. In step 1200, the system receives a request to view a newsroom. In step 1202, the system determines whether the user is logged in or not. If the user is not logged in, the system, in step 1204 receives news information from a third party news information service and presents it to the user in a web page hosted by the system. By incorporating third party content into a system hosted page, the content is better integrated into the system and does not require affirmative steps on the part of the user to return to the system web site. Preferably, the news content information includes a selectable listing of categories, enabling users to narrow the display of news content to a particular category.

If it is determined in step 1202 that the user is logged in, the system, in step 1206, retrieves and displays substantially identical news content information to that described above, however, the content of the news may be modifiable by the user in accordance with previously established user preferences and also includes an option, in step 1207, to modify news preferences (if any) so as to enable filtering of the news content displayed to the user. If a user desires to modify their news preferences, the system, in step 1208, receives a user request to modify their news preferences. In step 1210, the system displays a listing of news categories available for user selection. In step 1212, the system receives user selections of any desired news categories. Upon submission of selected news categories, the system, in step 1214 retrieves and displays a third party news content page including only headlines related to the user's selected categories.

Figure 13:
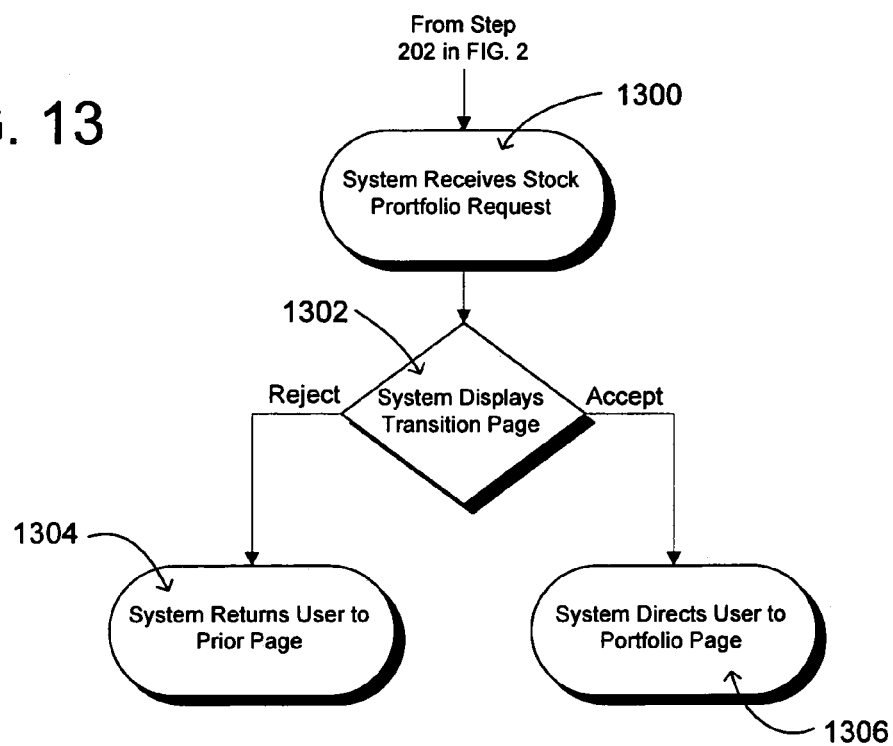
FIG. 13 is a flow chart describing one embodiment of a method for providing stock portfolio information to a user.

Referring now to FIG. 13, there is shown a flow chart describing a method for providing stock portfolio information to a user. In step 1300, the system receives a request to create or view a personal stock portfolio. Although not limited thereto, the presently preferred embodiment for providing stock portfolio information includes linking the user to a third party system offering such services, such as CNBC.com, offered by National Broadcasting Company, Inc. (http://www.cnbc.com). In step 1302, the system displays a transition page describing that the portfolio service is administered by a third party and including a option for the user to confirm or reject transition to the third party site. If the user rejects the transition, the system, in step 1304, returns the user to the page on the site from which they selected the create or view personal stock portfolio option. However, if the user accepts the transition, the system, in step 1306 opens a pop-up window including the third party site, wherein the user may input, save, and track a personalized stock portfolio.

In an alternative embodiment, stock portfolio capabilities may be incorporated into the content hosted by the system, rather than provided by a third party. If so, users will be required to register with the system prior to portfolio creation, thereby enabling saving of the portfolio to the user's profile.

Figure 14:
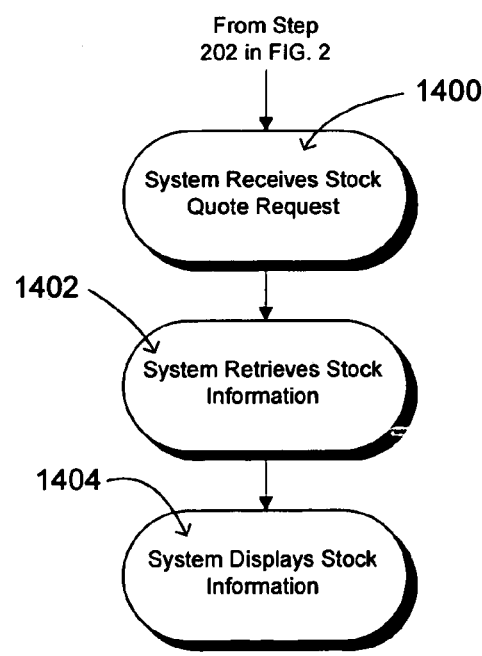
FIG. 14 is a flow chart describing one embodiment of a method for providing stock quote information to a user.

An addition feature available on one preferred embodiment of the learning center home page is a stock quote option enabling users to enter a stock quote and receive recent information for the submitted company. Referring now to FIG. 14, there is shown a flow chart describing one embodiment of a method for providing stock quote information to a user. In step 1400, the system receives a user submitted stock ticker symbol or company name. In step 1402, the system, in a manner similar to that described for the stock portfolio above, sends the ticker symbol or company name to a third party content provider. In step 1404, the system opens a pop-up window including the financial information available for the submitted symbol or name, wherein the pop-up window includes content owned by the third party provider.

Figure 15:
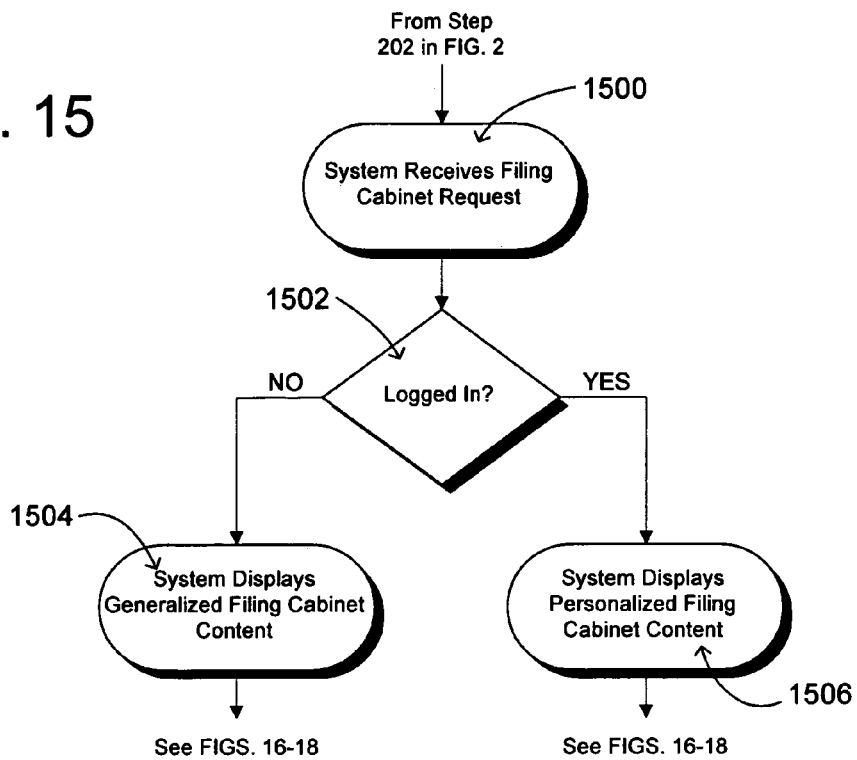
FIG. 15 is a flow chart describing one embodiment of a method for providing an interactive on-line filing cabinet to a user.

Another feature available to system users is a filing cabinet feature that enables users to store a variety of information for subsequent retrieval. Referring now to FIG. 15, there is shown a flow chart describing one embodiment of a method for providing an interactive on-line filing cabinet to a user. In step 1500, the system receives a user request to view their filing cabinet. Preferably, this request is made via a filing cabinet option available on the learning center home page, however, suitable alternatives are envisioned. In step 1502, the system determines whether the user is logged in or not. If the user is not logged in, the system, in step 1504, displays a filing cabinet page to the user wherein each of the filing cabinet options are generalized. If the user is logged in, the filing cabinet page includes personalized information tailored to the user's specified interests. In particular, whether personalized or general, the filing cabinet page preferably includes a variety of options including: 1) an in-box section for displaying message subjects and storing messages from the system to the user (for logged in users, the in-box includes schedule reminders, alerts about content and features, community-specific information, etc.); 2) a notes section for enabling the user to view, modify, save, and create their own notes, preferably up to a predetermined maximum of 50 notes; 3) a reminders section for enabling users to establish reminders about specific activities, preferably up to a predetermined of 100; and 4) a stock quote look up section, similar to that described above, for enabling users to look up stock information on specified companies. Due to the variety of features present on the filing cabinet page, users may select a variety of options, some of which are described in detail below.

Figure 16:
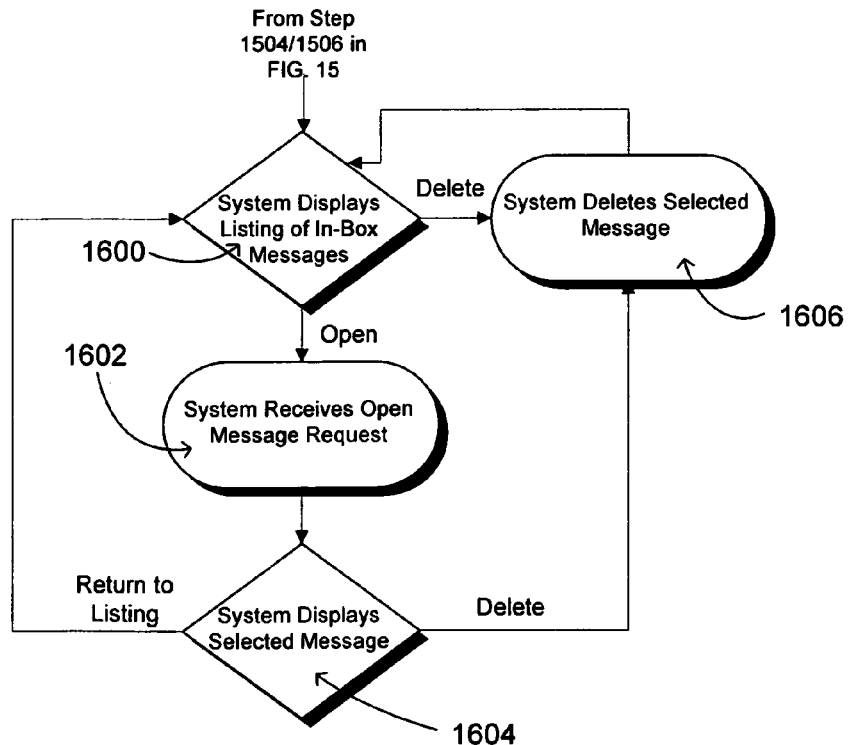
FIG. 16 is a flow chart describing one embodiment of a method for providing an in-box message service to a user.

Referring now to FIG. 16, there is shown a flow chart describing one embodiment of a method for providing an in-box message service to a user. In step 1600, the system displays a list of in-box messages to the user as well as options to open, and delete a selected message. In step 1602, the system, receives an open message request from the user. In response, the system, in step 1604, opens the requested message and displays the content to the user, options are also provided for deleting the message or returning to the filing cabinet page. If the system receives a delete message request, initiated at either the filing cabinet page or the message content page and, in step 1606, the system deletes the message from the user's inbox and returns to step 1600, where the message listing is refreshed and re-displayed. Preferably, user acknowledgment of the delete request is required prior to deletion, but this feature is not required for system operation.

Figure 17:
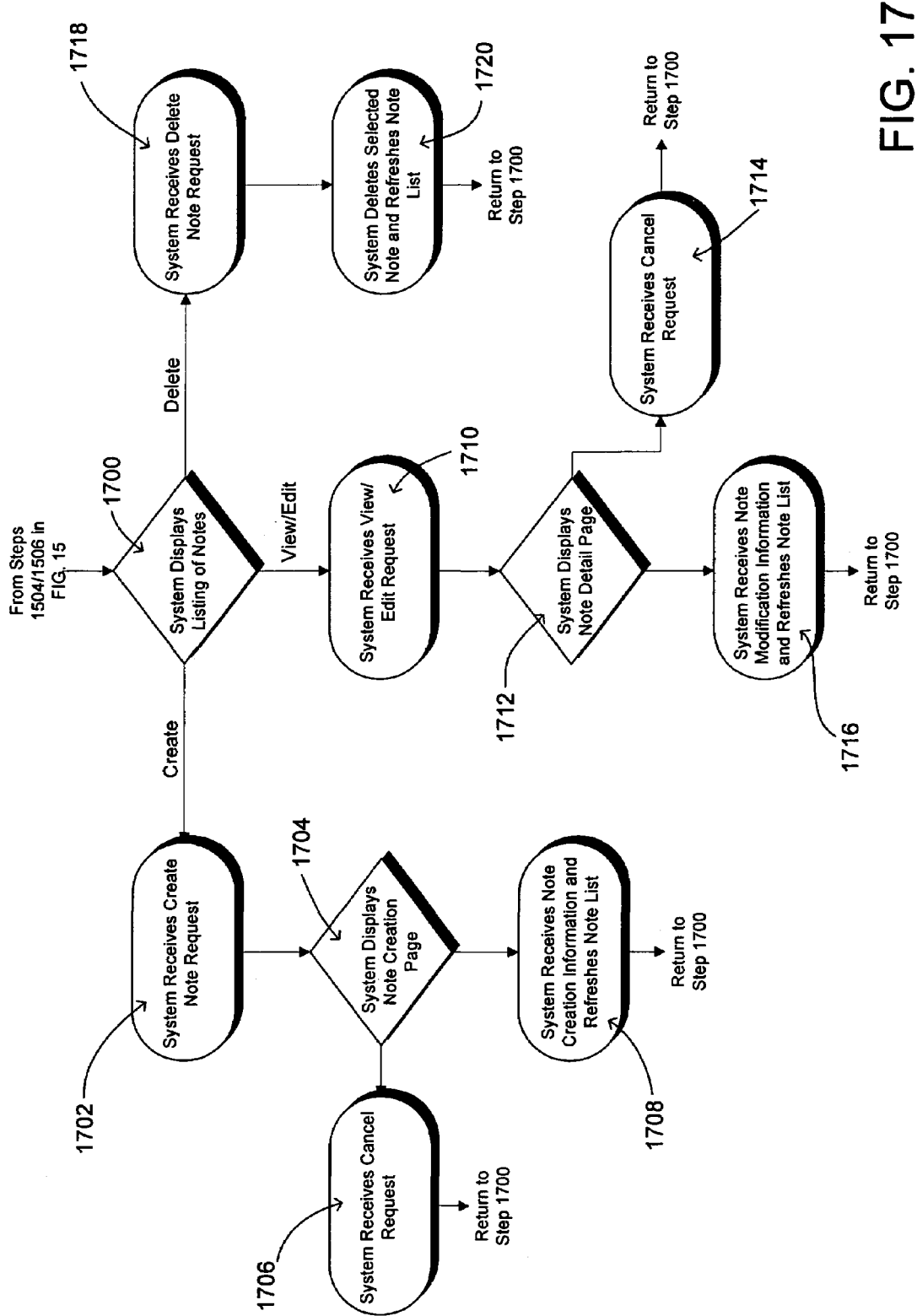
FIG. 17 is a flow chart describing one embodiment of a method for providing an on-line note service to a user.

Referring now to FIG. 17, there is shown a flow chart describing one embodiment of a method for providing notes to a user. In step 1700, the system displays a listing of all current notes as well as options to view and edit, create, or delete notes. In step 1702, the system receives a user request to create a new note. In response, the system, in step 1704 displays a note creation page including fields relating to the subject of the reminder and a description of the note. The note creation page also includes a plurality of options related to canceling the created note, saving the created note, and viewing a list of all saved notes. In step 1706, the system receives a request to either cancel the created note or view the listing of previously saved notes, and returns the user to step 1700. In step the 1708, the system receives the note information and, after determining that all required fields have been submitted, refreshes the note list and returns the user to step 1700.

In step 1710, the system receives a user request to view or edit a selected note. In response, the system, in step 1712, displays a note details page showing the information previously saved for the selected note. The note details page includes an option to cancel the edit and return to the note list as well as an option to modify the information and submit the changes to the system. In step 1714, the system receives a request to cancel the edit, and returns the user to step 1700. In step the 1716, the system receives the modified note information and, after determining that all required fields have been properly submitted, refreshes the note list and returns the user to step 1700. In step 1718, the system receives a user request to delete a selected note. In response, the system, in step 1720, deletes the note, refreshes the reminder list and returns the user to step 1700. Preferably a deletion request requires affirmative confirmation by the user, but this step is not required in operation of the system.

Figure 18:
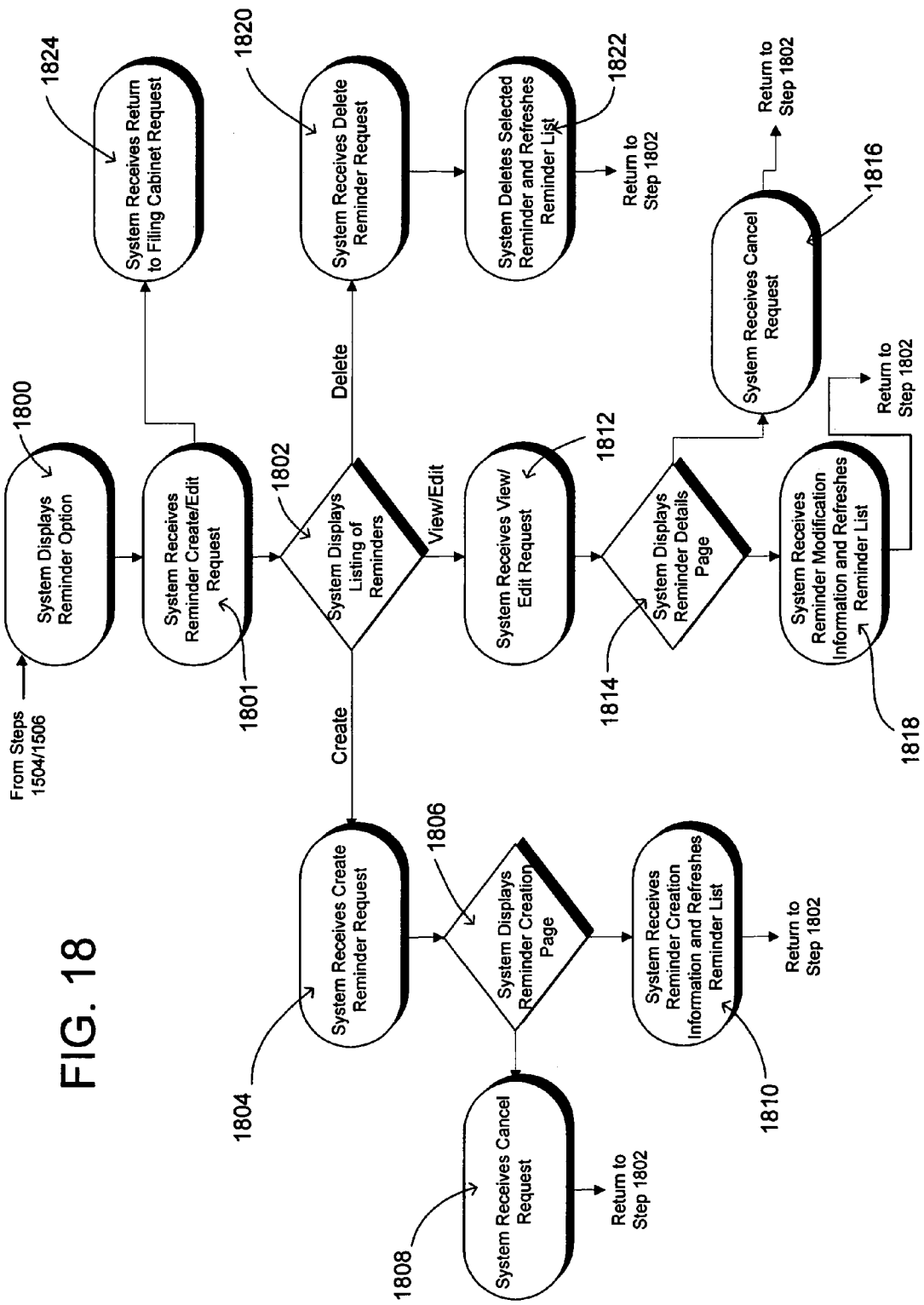
FIG. 18 is a flow chart describing one embodiment of a method for providing an on-line reminder service to a user.

Referring now to FIG. 18, there is shown a flow chart describing one embodiment of a method for providing reminders to a user. In step 1800, the system displays an option to create or edit reminders. In step 1801, the system receives a user request to create or edit a reminder. In response, the system, in step 1802, displays a create/edit reminders page including a listing of all current reminders as well as options to view and edit, create, or delete notes. In step 1804, the system receives a user request to create a new reminder. In response, the system, in step 1806 displays a reminder creation page including fields relating to the subject of the reminder, the reminder date, and a description of the reminder. The reminder creation page also includes a plurality of options related to canceling the reminder creation, and submitting the reminder creation. In step 1808, the system receives a request to cancel the reminder, and returns the user to step 1802. In step the 1810, the system receives the reminder information and, after determining that all required fields have been submitted, refreshes the reminder list and returns the user to step 1802. A message is sent to the user's inbox on the submitted reminder date.

In step 1812, the system receives a user request to view or edit a selected reminder. In response, the system, in step 1814, displays a reminder details page showing the information previously saved for the selected reminder. The reminder details page includes an option to cancel the edit and return to the reminder list as well as an option to modify the information and submit the changes to the system. In step 1816, the system receives a request to cancel the edit, and returns the user to step 1802. In step the 1818, the system receives the modified reminder information and, after determining that all required fields have been properly submitted, refreshes the reminder list and returns the user to step 1802. In step 1820, the system receives a user request to delete a reminder. In response, the system, in step 1822, deletes the reminder, refreshes the reminder list and returns the user to step 1802. Upon completion of reminder viewing, editing, and deleting, the system receives a request to re-display the filing cabinet page in step 1824.

Figure 19:
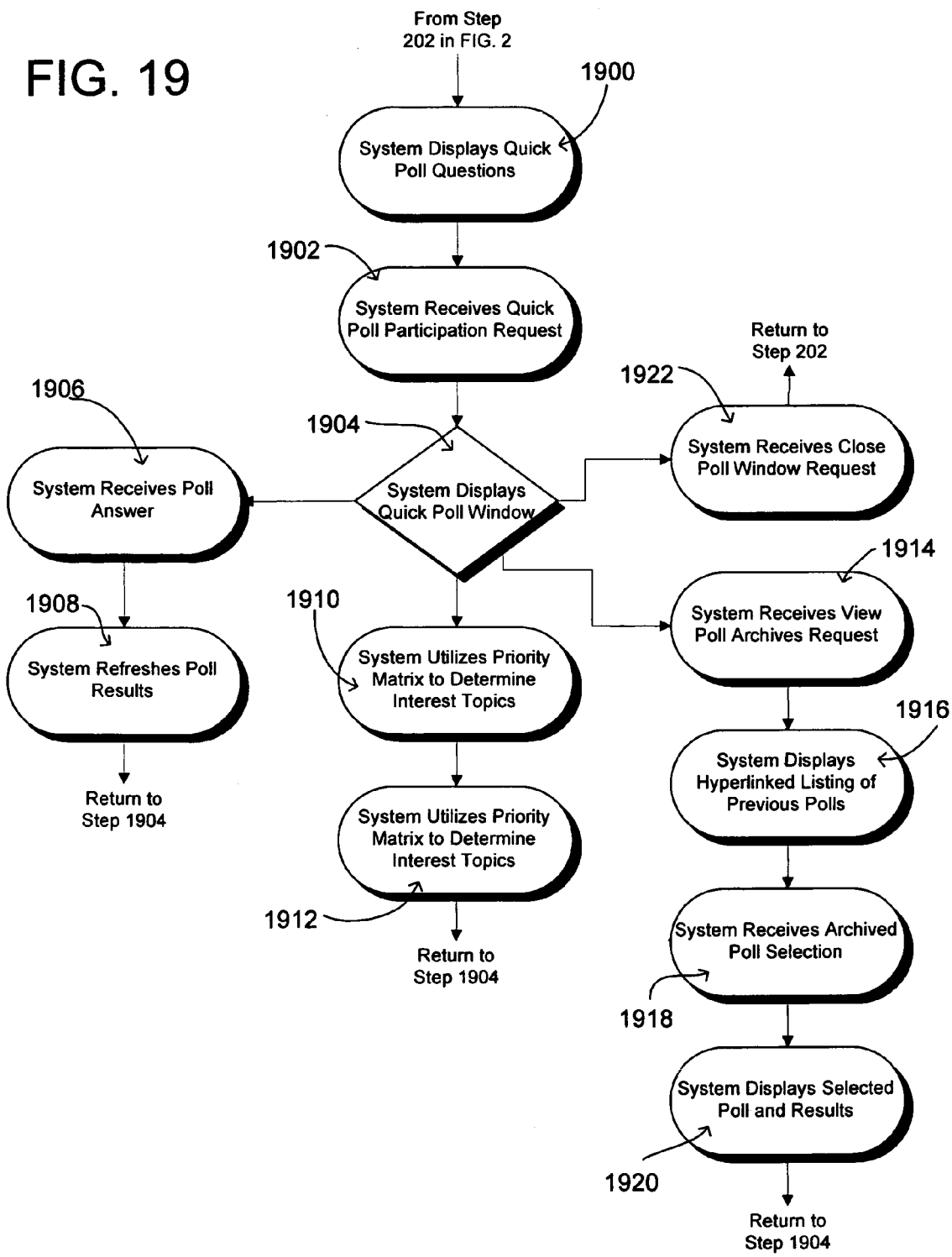
FIG. 19 is a flow chart describing one embodiment of a method for providing an on-line poll to a user.

An additional feature preferably available on the learning center home is the quick poll feature. A quick poll is a simple question asked to users wherein the results of the poll are immediately tabulated and displayed to the user. Referring now to FIG. 19, there is shown a flow chart describing a method for providing an on-line poll to a user. In step 1900, the system displays a quick poll question to the user. In step 1902, the system receives a request to participate in the quick poll. This request is typically submitted by simply clicking on the poll question. In step 1904, the system displays a quick poll pop-up window including the poll question and the possible answers. It is anticipated that many quick poll questions will be of the "yes or no" variety, however, other forms of multiple choice questions are also envisioned.

The quick poll window also preferably includes options to close the window, view the day's results, and view the archive or previous quick polls. In step 1906, the system receives the users answer to the quick poll question. In step 1908, the system refreshes the poll results and displays the results to the user in a graphical manner. In step 1910, the system receives a user request to view the day's results. In response, the system, in step 1912, displays a graphical representation of the results to the day's poll. In step 1914, the system receives a request to view the quick poll archives. In response, the system, in step 1916, displays a hyperlinked listing previous polls. In step 1918, the system receives a selection of a particular poll archive and, in step 1920, displays the selected poll and results. The system then returns the user to step 1904. In step 1922, the system receives a request to close the quick poll window. In response, the system, signals the user computer to close the quick poll window, thus returning the user to the learning center home page (step 202).

Figure 20:
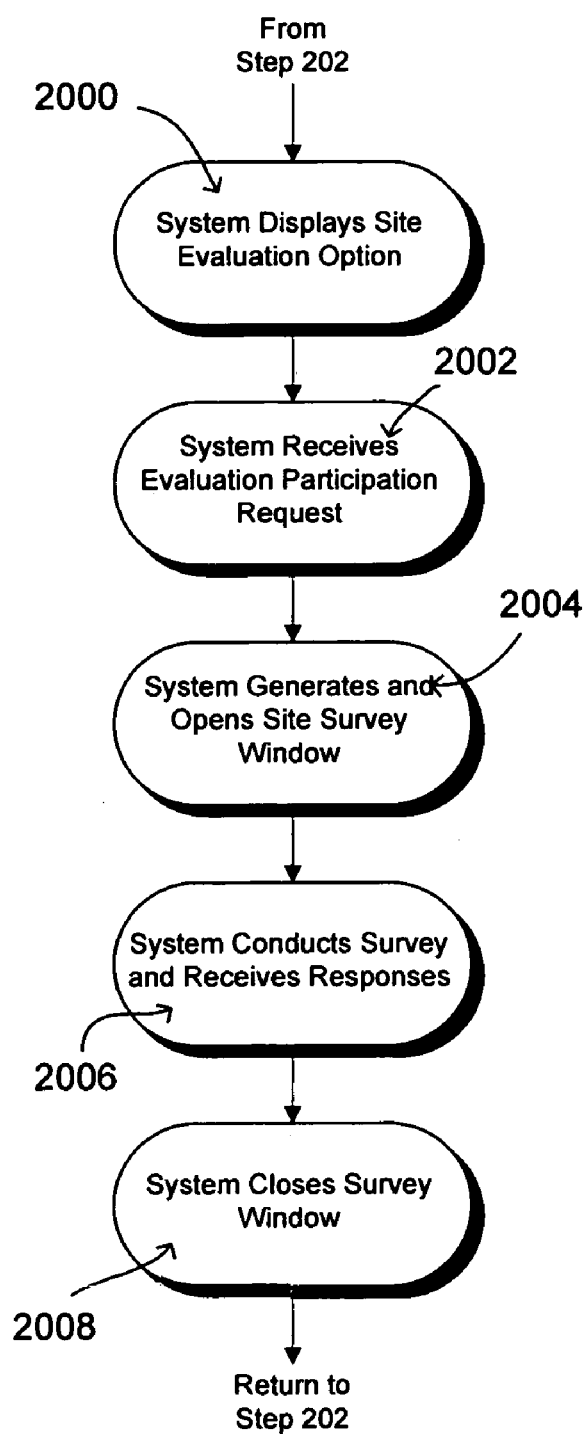
FIG. 20 is a flow chart describing one embodiment of a method for providing an interactive site evaluation to a user.

In addition to learning related services and system resources, in an effort to provide the best possible system for users, one embodiment of the system of the present invention also includes a system evaluation survey option available on the learning center home page, wherein users can answer short questions concerning the web site and its effectiveness in providing on-line educational services. Referring now to FIG. 20, there is shown a flow chart describing a method for providing an interactive site evaluation survey to a user. In step 2000, the system displays a site evaluation survey option to the user. In step 2002, the system, receives a request to participate in the survey. In step 2004, the system generates and opens a site evaluation survey window, preferably as a pop-up window. The site administration survey may be administered by the system itself, or, in a preferred embodiment, administered by a third party content provider. Upon display of the site evaluation survey window, the survey is conducted, in step 2006, by systematically leading the user through a series of questions dealing specifically with site operation, layout, effectiveness, as well as future service options. Upon completion of the survey, the window is closed, in step 2008, and the user is returned to the learning center home page (step 202).

By providing a system and method for generating and presenting a specialized curriculum of learning materials, the present invention enables more individuals to learn at an individualized pace and level, thereby better meeting the needs and requirements of the students. In addition to learning materials, the present system and method also provides a wide variety of resources to such students so as to enhance the learning process and to facilitate the completion of the course of study. Also, in the form of interactive evaluations and surveys, the present invention invites comment and suggestions so as to improve the overall learning process.

While the foregoing description includes many details and specificities, it is to be understood that these have been included for purposes of explanation only, and are not to be interpreted as limitations of the present invention. Many modifications to the embodiments described above can be made without departing from the spirit and scope of the invention, as is intended to be encompassed by the following claims and their legal equivalents.

We claim:

1. A method for interactively providing a specialized learning curriculum over a computer network comprising the steps of:

receiving, from a client computer associated with a user, personal information relating to at least one user interest;

storing said personal information on at least one server computer associated with an education content provider;

generating a specialized learning curriculum based upon said personal information; and displaying said specialized learning curriculum to said user;

wherein said personal information includes community information generally describing the user;

wherein said personal information further includes interest topic information more specifically describing the interests of the user;

further comprising the steps of:

displaying a plurality of selectable interest topic fields to the user; and receiving user selections of at least one of said plurality of the interest topics included in said selectable interest topic fields;

wherein the step of generating a specialized learning curriculum based upon said personal information further comprises the steps of:

determining, based upon said received community information and said selected interest topics, a preselected number of interest topics to utilize in generating said specialized learning curriculum;

identifying content elements categorized into said preselected number of interest topics;

selecting, for each of said preselected number of interest topics, a predetermined number of content elements for inclusion in said learning curriculum; and displaying a listing of said preselected number of content elements.

2. The method of claim 1, wherein said content elements include interactive courses and workshops, basic tutorials, articles, and interactive games, user activities and calculation tools.

3. The method of claim 2, wherein said step of selecting a predetermined number of content elements includes selecting two course and workshop elements, one basic tutorial element, four article elements, and two game and tool elements.

4. The method of claim 1, further comprising the steps of:

generating, based upon said community information, a priority listing of available interest topics wherein each available interest topic has a rating:

determining whether the user has selected the preselected number of interest topics;

if it is determined that the user has selected less than the preselected number of interest topics, selecting, from said priority listing, the highest rated interest topics not previously selected by the user so that a total number of interest topics selected is equal to the preselected number of interest topics; and if it is determined that the user has selected more than the preselected number of interest topics, randomly selecting the preselected number of Interest topics from the user selected interest topics.

5. The method of claim 4, wherein the preselected number of interest topics is four.

6. A method for interactively providing a specialized learning curriculum over a computer network comprising the steps of:

receiving, from a client computer associated with a user, personal information relating to at least one user interest;

storing said personal information on at least one server computer associated with an education content provider;

generating a specialized learning curriculum based upon said personal information; and displaying said specialized learning curriculum to said user;

further comprising the steps of:

receiving a request to view a content element identified in said specialized learning curriculum;

displaying said content element to said user; and receiving content evaluation information from the user relating to the displayed content element.

7. The method of claim 6, wherein said content evaluation information includes a numerical rating.

8. A system for providing a specialized learning curriculum over a computer network, comprising:

at least one server computer associated with an education content provider; and a plurality of client computers associated with a plurality of users, said plurality of client computers being connected to said at least one server computer over the computer network, wherein said at least one server computer incorporates at least one server application including one or more instructions for receiving personal information relating to at least one user interest, one or more instructions for storing said personal information on said at least one server computer, one or more instructions for generating a specialized learning curriculum based upon said personal information, and one or more instructions for displaying said specialized learning curriculum to said user;

wherein said personal information includes community information generally describing the user;

wherein said personal information further includes interest topic information more specifically describing the interests of the user;

wherein said at least one server application further includes:

one or more instructions for displaying a plurality of selectable interest topic fields to the user; and one or more instructions for receiving user selections of at least one of said plurality of the interest topics included in said selectable interest topic fields;

wherein the one or more instructions for generating a specialized learning curriculum based upon said personal information further comprises:

one or more instructions for determining, based upon said received community information and said selected interest topics, a preselected number of interest topics to utilize in generating said specialized learning curriculum;

one or more instructions for identifying content elements categorized into said preselected number of interest topics;

one or more instructions for selecting, for each of said preselected number of interest topics, a predetermined number of content elements for inclusion in said learning curriculum; and one or more instructions for displaying a listing of said preselected number of content elements.

9. The system of claim 7, wherein said content elements include interactive courses and workshops, basic tutorials, articles, and interactive games, user activities and calculation tools.

10. The system of claim 9, wherein said one or more instructions for selecting a predetermined number of content elements includes one or more instructions for selecting two course and workshop elements, one basic tutorial element, four article elements, and two game and tool elements.

11. The system of claim 8, wherein said at least one server application further includes:

one or more instructions for generating, based upon said community information, a priority listing of available interest topics wherein each available interest topic has a rating;

one or more instructions for determining whether the user has selected the preselected number of interest topics;

one or more instructions for selecting, from said priority listing, the highest rated interest topics not previously selected by the user so that a total number of interest topics selected is equal to the preselected number of interest topics if it is determined that the user has selected less than the preselected number of interest topics; and one or more Instructions for randomly selecting the preselected number of interest topics from the user selected interest topics if it is determined that the user has selected more than the preselected number of interest topics.

12. The system of claim 11, wherein the preselected number of interest topics is four.

13. A system for providing a specialized learning curriculum over a computer network, comprising:

at least one server computer associated with an education content provider; and a plurality of client computers associated with a plurality of users, said plurality of client computers being connected to said at least one server computer over the computer network, wherein said at least one server computer incorporates at least one server application including one or more instructions for receiving personal information relating to at least one user interest, one or more instructions for storing said personal information on said at least one server computer, one or more instructions for generating a specialized learning curriculum based upon said personal information, and one or more instructions for displaying said specialized learning curriculum to said user;

wherein said at least one server application further includes:

one or more instructions for receiving a request to view a content element identified in said specialized learning curriculum;

one or more instructions for displaying said content element to said user; and one or more instructions for receiving content evaluation information from the user relating to the displayed content element.

14. The system of claim 13, wherein said content evaluation information includes a numerical rating.

* * * * *

UNITED STATES PATENT AND TRADEMARK OFFICE
CERTIFICATE OF CORRECTION

| | |
|---|---|
| PATENT NO. | : 7,013,325 B1 |
| APPLICATION NO. | : 09/695830 |
| DATED | : March 14, 2006 |
| INVENTOR(S) | : Kathryn B. Vivian et al. |

It is certified that error appears in the above-identified patent and that said Letters Patent is hereby corrected as shown below:

Column 2, line 26, remove the number "1."

The dependency of claim 9, col. 20, line 47, should be claim 8, and not claim 7.

Signed and Sealed this

Twenty-eighth Day of November, 2006

JON W. DUDAS
*Director of the United States Patent and Trademark Office*